United States Patent [19]

Corder

[11] Patent Number: 5,302,132
[45] Date of Patent: Apr. 12, 1994

[54] INSTRUCTIONAL SYSTEM AND METHOD FOR IMPROVING COMMUNICATION SKILLS

[76] Inventor: Paul R. Corder, 522 Hillhurst Dr., Baytown, Tex. 77521

[21] Appl. No.: 863,687

[22] Filed: Apr. 1, 1992

[51] Int. Cl.$^5$ .............................................. G09B 19/00
[52] U.S. Cl. ................................. 434/156; 434/169; 434/307; 434/323; 434/362; 364/419.03; 395/160; 395/927; 381/51; 345/173; 345/180
[58] Field of Search ............... 434/156, 157, 169, 185, 434/307, 308, 322, 323, 327, 335, 350, 362, 365; 364/411, 419; 395/144, 159, 160, 927; 340/706, 707, 709, 712, 723; 381/51

[56] References Cited

U.S. PATENT DOCUMENTS

| | | | |
|---|---|---|---|
| 4,576,578 | 3/1986 | Parker et al. | 434/307 |
| 4,694,494 | 9/1987 | Woolfson | 434/112 X |
| 4,895,518 | 1/1990 | Arnold et al. | 434/335 X |
| 4,954,969 | 9/1990 | Tsumora | 395/160 |
| 5,018,082 | 5/1991 | Obata et al. | 434/335 X |
| 5,111,409 | 5/1992 | Gosper et al. | 434/185 X |
| 5,134,560 | 7/1992 | Ferriter et al. | 395/159 X |

*Primary Examiner*—Richard J. Apley
*Assistant Examiner*—Joe H. Cheng
*Attorney, Agent, or Firm*—Vaden, Eickenroht, Thompson, Boulware & Feather

[57] ABSTRACT

Method and system for reducing illiteracy of individuals accompanied by improvements in functionality utilizing computer technology to integrate multi-sensory stimuli for synthesis of individualized instruction, evaluation, and prescription for advancement of communications skills. The method is employed to, for instance, advance a learner from status as a nonreader to being a skilled user of a language to express ideas and concepts.

5 Claims, 29 Drawing Sheets

Student's Workstation

| CHANNEL OF LEARNING | SYSTEM STIMULI | STUDENT RESPONSES | EVALUATION CRITERIA | COMMENTS |
|---|---|---|---|---|
| AUDITORY | Colors<br>Shapes<br>Objects<br>Phonogram<br>Syllable<br>Word<br>Phrase<br>Sentence<br>Paragraph | • Say as directed<br>• Record voice<br>• Click on choice<br>  - Mouse<br>  - Touch screen<br>  - Graphics tablet<br>• Trace as directed<br>  - Mouse<br>  - Touch screen<br>  - Graphics tablet<br>• Reduce to notes<br>  - Typing<br>  - Writing<br>• Translating<br>• Brailling<br>• Hand Signing | • Accuracy in recording<br>• Accuracy in response (i.e., tracing, typing, writing, etc)<br>• Number of tries<br>• Time used total and per try<br>• Frequency content and distribution<br>• Duration of sound<br>• Mean Square Value<br>• Probability Density Function<br>• Power Spectral Density Function<br>• Auto-correlation Function<br>• Replicability<br>• Improvement<br>• Retentivity | • Statistical frequency of accuracy<br>• FFT (Fast Fourier Transforms)<br>• Waveform comparison<br>• Energy associated with waveform<br>• Properties of waveform in amplitude domain<br>• Waveform properties in time domain<br>• Properties of waveform in frequency domain<br>• Standard suitable to regional differences<br>• Location on screen<br>• Beginning point<br>• Path of trace<br>• Deviation from preferred path produces beeps or flashes and is recorded in memory<br>• Adherence to the preferred path by the student automatically satisfies criteria for aspects, such as slant, spacing, and proportion of parts<br>• Records saved in memory |

FIG. 12(a)

| CHANNEL OF LEARNING | SYSTEM STIMULI | STUDENT RESPONSES | EVALUATION CRITERIA | COMMENTS |
|---|---|---|---|---|
| VISUAL | Colors<br>Shapes<br>Objects<br>Outline Shapes<br>- Letters<br>- Lines<br>- Arcs<br>- Curves<br>- Other<br>Phonogram<br>Syllable<br>Word<br>Phrase<br>Sentence<br>Paragraph | • Click on choice<br>- Mouse<br>- Touch screen<br>- Graphics tablet<br>• Trace as directed<br>- Mouse<br>- Touch screen<br>- Graphics tablet<br>• Type on keyboard<br>• Write<br>- Touch screen<br>- Graphics tablet<br>• Trace within<br>- Mouse<br>- Touch screen<br>- Graphics tablet<br>• Hand Signing | • Accuracy in response (i.e., tracing, typing, writing, etc)<br>• Number of tries<br>• Time used total and per try<br>• Smoothness of tracings<br>• Accuracy in staying within outline shape during tracing<br>• Accuracy influenced by component used?<br>• Replicability<br>• Improvement<br>• Retentivity | • Statistical frequency of accuracy<br>• Location on screen<br>• Beginning point<br>• Path of trace<br>• Deviation from preferred path produces beeps or flashes which are recorded in memory<br>• Adherence to the preferred path by the student automatically satisfies criteria for characteristics, such as slant, spacing, and proportion of parts<br>• Records saved for future analysis |

FIG. 12(b)

| CHANNEL OF LEARNING | SYSTEM STIMULI | STUDENT RESPONSES | EVALUATION CRITERIA | COMMENTS |
|---|---|---|---|---|
| VERBAL | Phonogram<br>Syllable<br>Word<br>Phrase<br>Sentence | • Say as directed<br>• Record voice | • Same as for AUDITORY | • Same as for AUDITORY |
| KINESTHETIC | • Same as for VISUAL | • Same as for VISUAL | • Same as for VISUAL | • Same as for VISUAL |
| TACTILE | • Shapes<br>• Objects<br>• Brailling<br>  - Letters<br>  - Lines<br>  - Arcs<br>  - Curves<br>  - Phonogram<br>  - Syllable<br>  - Word<br>  - Phrase<br>  - Sentence<br>  - Paragraph | • Type of keyboard<br>• Braille<br>• Say as directed / record | • Same as for VISUAL<br>• Comparison of brailled response with stimuli | • Same as for VISUAL |

FIG. 12(c)

INSTRUCTIONAL SYSTEM AND METHOD FOR IMPROVING COMMUNICATION SKILLS

BACKGROUND OF THE INVENTION

Portions or the disclosure of this patent document contain material which is subject to copyright protection. The copyright owner has no objection to the facsimile reproduction by anyone of the patent document or the patent disclosure, as it appears in the Patent and Trademark Office patent files or records, but otherwise reserves all copyright rights in this material.

1. Field of the Invention

The present invention relates to the use of a computer based instructional system to improve communications skills of individuals accompanied by improvements in their functionality in speaking, spelling, writing, reading, brailling, signing or translating language.

2. Description of the Prior Art

Each new development in communications technology has been touted as having a bright potential capable of revolutionizing education. New pieces of equipment are offered by manufacturers and adopted by school boards intent on fulfilling their educational objectives. All too frequently these pieces of hardware are oversold, under used, and then discarded. Technological innovations have come and gone without stimulating revolution because the hardware has been better than the software and management design controlling it.

The computer is the latest technology under trial. Computers execute programs, or software. There are four principal categories of educational software. They are tutorial, drill and practice, simulation, and utility. With respect to educational content, tutorial software provides some facts. These facts might range from how to punctuate a sentence to how to use a piece of equipment. The number of programs of this type is growing, but still not plentiful. Drill and practice programs are the most numerous of the educational software packages available. Usually, these programs operate with the assumption that the material has already been presented to the student; the programs provide only exercises which reinforce previously presented material or concepts. Some drill and practice programs do include tutorial information on concepts with which the student is having trouble.

Teaching a foreign language is an example of computer assisted drill and practice activity. Here the computer is used to augment verbal drills. In teaching German, the student might be given the stimulus "Ich bin hier" followed by a prompt "Du." The student must respond with "Du bist hier." Anything else is judged incorrect.

Simulation programs model particular situations, such as chemical reactions in a test tube when specified chemicals are added together. Because they incorporate "what if" types of questions, simulation programs hasten learning by discovery. However, because of the demanding program design, logic, and programming effort, simulation programs are often limited in their scope and simply not as available as drill and practice packages.

The fourth category, utility, is a collection of programs which function in supporting roles. Examples of such programs include statistical or calculational programs for studying the mathematics of chemical reaction simulation programs. The role of the software in this category is as a tool in the learning process.

Initial applications of microcomputers in the classroom were in the teaching of computer literacy and programming languages, such as LOGO TM. Such languages allowed the student to "direct" the computer to follow specified instructions and present the results, usually graphically. Computer labs became very popular in many schools as new instructional procedures were developed to accommodate this new technology. More recent trends have seen the computers move out of the labs and back into the classrooms where they are being used as learning tools.

Seen in this light, the computer has been used as an alternative to textbook exercises or to augment a human drill instructor and has provided no real innovation in pedagogy. Instead, computer assisted instruction has used the superior speed and repeatability of the computer to present improved versions of selected portions of a human teacher's presentation. There has been little effort in utilizing the fundamental capabilities of computer mediated technology to present unique pedagogical methods.

The computer in these applications is merely a more animated version of paper-based programs of instruction. Unfortunately, in these applications, the computer's speed and accuracy is offset by its inflexibility. The most critical deficiency of even the most advanced current computer mediated instructional programs is the lack of facility in dealing with the different cognitive learning styles of the students using the program.

Learning occurs in a process of stimulus, reaction and reinforcement. Each action may occupy any or all of the available sensory pathways involving seeing, hearing, speaking, touching, or kinetic moving. Learning activities are strongly influenced by experience and culture. There is evidence that sex may have an influence on learning patterns. Young children do not learn the same way as adults. People learning a second language do not learn it the way they learned their first, or native, language. People with sensory or motor handicaps adapt to different learning styles consistent with their existing capabilities. Existing computer mediated instructional applications do not adequately deal with this diversity of learning styles. Learners are constrained to follow preprogrammed patterns that do not evaluate each individual to determine the optimal sequence of stimulus, response and reinforcement that leads to the most efficient learning with the greatest retention. These programs lack the structure and methods necessary to diagnose individual capabilities and efficiencies, provide individualized instruction and evaluate results.

It is the object of this invention to utilize computer technology to integrate multi-sensory stimuli in a comprehensive system for synthesis of individualized evaluation, prescription, instruction, and testing for advancement of communications skills in spoken, written, aural, visual or tactile modes as depicted in FIG. 1 in any of an unlimited number of languages.

It is a further objective of this invention to provide a system to support the teaching of symbols formed of 15 single or multiple letters of an alphabet (phonograms) in association with their sound or sounds.

It is a further objective of this invention to provide a system to teach the techniques and procedures for combining phonograms into syllables, and then into the words of a language and, thus, to teach correct enunciation, spelling, writing, and reading.

It is a further objective of this invention to provide a system to teach the techniques and procedures for combining words into grammatically correct and meaningful sentences.

It is a further objective of this invention to provide a system to teach the techniques and procedures for combining sentences into paragraphs or essays conveying meaningful expression and thought.

It is a further objective of this invention to provide a system to teach efficient, comprehensive note-taking to the student receiving delivered oral and visual discourse.

It is a further objective of this invention to provide a system to teach identification and comprehension of braille for unsighted learners.

It is a further objective of this invention to provide a system to teach efficient and comprehensive recognition of hand signs associated with letters, words, and phrases for deaf learners.

It is a further objective of this invention to provide a system to teach the use and practice of specialized vocabularies, such as those involved in scientific, technological and engineering fields.

It is a further objective of this invention to provide a system to teach interpretation of and translation between languages.

SUMMARY OF THE INVENTION

These objectives, and the advantages, of the present invention are accomplished by providing a method, and an apparatus for implementing that method, of teaching communication skills utilizing a computer based instructional system including processing, storage, input and output means comprising the steps of (a) preliminarily evaluating a student's skills using computer generated stimuli requiring the student to respond thereto and stored data, if any, indicating the student's previous performance, said stimuli and the student's responses thereto utilizing one or more sensory or motor learning channels selected from the set of available channels; (b) selecting a target instructional objective for mastering a language construct, the target objective being selected from a plurality of hierarchically ranked objectives stored in said system, the target objective either sequentially following from a previously mastered objective, if any, or being externally selected by a teacher supervising system use; and (c) using the results of the evaluation and the data from the student's previous performance, if any, to identify an optional cognitive strategy combining a plurality of the learning channels and the components of said system to achieve the target objective with the greatest efficiency and retentivity, the optimal strategy employing alternative combinations of learning channels as the student progressively encounters subsequent objectives to develop proficiency in a plurality of learning channels. Once the optimal strategy is identified, the method continues by (d) assessing the results of the application of the optimal strategy by testing the student's ability to reproduce, recognize, print, cursively write, sign, pronounce, spell, use, translate, or identify the target objective using decision rules stored in said system for comparing the results of the testing to predetermined performance criteria stored in said system, said system serving as both the means for generating test stimuli and receiving the response of the student to the stimulus; (e) repeating steps (c) and (d) if the test results do not exceed the predetermined performance criterium; and (f) when the predetermined performance criterium has been achieved, repeating steps (b) through (e) with the next higher ranked objective. Steps (b) through (f) are then repeated until the student masters the target objective.

BRIEF DESCRIPTION OF THE FIGURES

FIG. 6a shows the loops 600–608 for testing the five CHANNELS OF LEARNING. FIG. 6b indicates that the SYSTEM COMPONENTS are evaluated with respect to the five CHANNELS OF LEARNING to address identified needs of the learner. FIG. 6c outlines the assessment of the learner's knowledge of the language. FIGS. 6a-6f provides a logical sequence for the teacher to follow in composing a lesson for a student. The "Call Lesson Menu Routines" 650 is expanded in FIG. 69.

FIG. 7a outlines the logic for assess the learner's Auditory ability. Comments 703, 707, and 713 are provided to the side of certain steps to explain what might happen at that point during the evaluation. FIG. 7b shows the logic for assessing the learner's Visual ability. FIG. 7c outlines the logic for assessinq the learner's Verbal ability. FIG. 7d outlines the logic for assessing the learner's Kinesthetic ability.

FIGS. 12a-12c are a table setting out criterion, or decision, reference rules used in the EVALUATE module 400 (FIG. 4).

DETAILED DESCRIPTION OF THE PREFERRED EMBODIMENT

Figure 1:
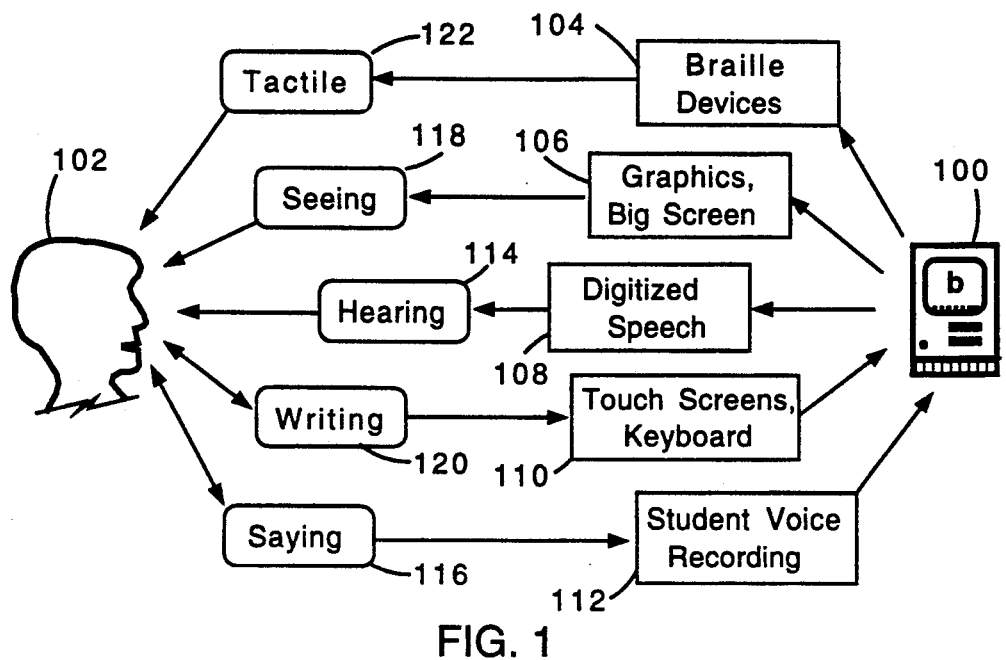
FIG. 1 is a schematic representation of the various interfaces incorporated into the method of the present invention. The independent channels of learning 114–122 are facilitated by computer components 100 and 104–112. These components are only a few among many possible combinations.

As used herein, the term "teaching" refers to a sequence of instructions involving developing instructional patterns or lessons, delivery of the instruction, evaluation of the student response and formation of recommendations for continuing the instruction for each student based on that student's learning style, capabilities and disabilities, if any.

As used herein, the term "teacher" refers to the person who is supervising the use of the method of the present invention. This person might be a traditional classroom teacher, a private tutor, or a parent. It could also refer to a therapist who is wanting to rehabilitate a particular deficient in a handicapped student.

The method described herein is unique as compared to the four types of educational software listed above in that it provides for comprehensive individualization of student lessons. The individualized lesson describes a planned sequence of stimuli and the range of acceptable responses provided by the individual student to the stimuli, interacting with the computer program to achieve a defined set of cognitive objectives. Because each student learns differently, the present method provides a resource for meeting each student's individualized instructional needs.

The method of the present invention is also unique in that it is characterized by a high degree of flexibility such that it can be used in, for instance, special education classrooms with certain adaptions in the system controlled human interfaces to match the computer to the specific capabilities of each student. For example, an electromechanical device such as a graphics tablet can be interfaced with the computer so that a physically handicapped student, who might have difficulty operating a mouse, can interact with the computer software, thus accessing the lessons determined to be needed.

The principal application of the method of the present invention is to teach the communication skills necessary for use of the English language, however, the method is not limited to English and may be utilized with any language. The presently preferred embodiment of the invention is based on the so-called "Spalding method" for teaching English as described in Spalding, R. B. and W. T., *The Writing Road to Reading, A Modern Method of Phonics for Teaching Children to Read*, William Morrow & Co., New York, N.Y. (1957), but is not limited to this approach or language.

The method provides an opportunity and mechanisms for the student to repeatedly exercise the functions of the computer, each repetition of which reinforces the learning process. For example, and as will be described, there are no artificial limits on the number of times the student can hear the sound(s) associated with the symbols presented on the computer monitor.

The method of the present invention also provides for the student to learn new facts from diverse subject matter, such as the rules of grammar, the history of the language being studied, or nature facts such as how tigers hunt and the bone structure of a bird. Initially, facts of the language, such as the rules which govern spelling, are learned in the process of learning sound-/symbol relationships and how these relationships are used to build syllables, words, sentences, and thus, essays by holding down the "Option" key on the computer keyboard while using the mouse to place the cursor over the "Books-on-Shelf" icon (item 920 in FIG. 9) and clicking the mouse button. Here, "clicking" means using the mouse to position the screen cursor over the "Books-on-Shelf" icon 920 then depressing and releasing, or clicking, the mouse button. This icon, or picture, is associated with the button containing the referenced script. Generally, clicking means positioning over a chosen icon, or selected screen element, and clicking the mouse button to signal initiation of an action associated with the icon or selected screen element. The cursor may also be moved using the arrow keys on the keyboard. There are also additional means for indicating action initiation equivalent to clicking the mouse button. Clicking the "Books-on-Shelf" button 920 causes a common sentence using the word shown on the screen to be spoken by the computer. Other features of the language, such as punctuation and grammar, are incorporated into the lessons as appropriate by holding down the "Option" and "Command" keys on the keyboard while using the mouse to place the cursor over the "Books-on-Shelf" icon 920 (see FIG. 9) and clicking the mouse button. The method of the present invention also provides features whereby the student gains proficiency in advanced communication skills, such as how to take notes.

The method provides immediate feedback on the correct response expected. For example, if the instructional objective is to teach the student how to take notes during a lecture on the benefits to the general public of the space station program, the student's typed "notes" are analyzed by the system and feedback is provided to the student in several forms. One such form is a recommended set of notes for the lecture. Another is an analysis of the notes made by the student with respect to their completeness and relevance to the topic.

The method of the present invention also provides functions for easing the teacher's work load. For instance, upon command the method is capable of producing student use reports about the exercises and storing the data for use in both monitoring the progress of the student and in mastering new target objectives.

A principal construct utilized by the method of the present invention (see FIG. 3) is the presentation of letters or combinations of letters in phonograms, e.g., symbols representing the sound(s) of a language. These phonograms 305 are used to form syllables and words and, thus, to teach spelling and sentence formation. There are seventy primary phonograms (and several secondary phonograms) of the Spalding method for teaching the English language contemplated by the method of the present invention. The primary phonograms are frequency-of-use dependent, and are listed in the order in which they are introduced when the Spalding method is utilized:

b, c, d, f, g, h, j, k, l, m, n, p, qu, r, s, t, v, w, x, y, z,
    a, e, i, o, u, er, ir, ur, wor, ear, sh, ee, th, ay, ai, ow,
    ou, oy, oi, aw, au, ew, ui, oo, ch, ng, ea, ar, ck, ed,
    or, wh, oa, ey, ei, ie, igh, eigh, kn, gn, wr, ph, dge,
    oe, gh, ti, si, ci, ough.

Of course, as noted above, the method is not limited to use of only the phonograms of the Spalding method, or for that matter, even to phonograms for use in the English language.

Using the phonograms and the method of the present invention, the student learns to associate the sounds of the English language (or any other language) with their written symbols. They learn to write these phonograms, as well as to recognize, or read, them. The brain is actively engaged in the direction of the hand in producing the symbols, thus achieving the reinforcing benefit of the kinesthetic action of writing. All types of writing, e.g., manuscript, cursive writing, printing, etc. are taught using phonograms in accordance with the present invention.

It is recognized that each student learns differently. Consequently, the present method provides infinitely adjustable alternative supervision to interpret individual student needs and to meet these needs with prescribed lesson applications.

The system will accept input from the teacher to control lesson scope and sequence and alternatively, the system itself contains decision rules to determine student needs based on the evaluation of system provided graded stimuli and matching student responses. The rules of the English language are introduced as they are needed to explain correct spelling and grammar. Functionally, the method of the present invention is user-friendly to the teacher as well as the student. For instance, icons (symbolic images commonly used in the art to represent and initiate specific system functions) are used instead of words on the computer screen to provide a consistent control interface for the user across all program segments. Pulldown, popup, or floating menus are available for additionally specifying program operations and controls. For optimum results with the method of the present invention, the teacher is pre-trained in the use of the program and its methodology.

There is another preprogrammed path to apply the method available for guiding learners who do not have convenient access to trained teachers. The teacher retains the option to override this path. For example, using the buttons (a portion of the screen that is responsive to student action keyed to that location such as mouse clicks, light pens, or keyboard strokes, to initiate a specific sequence of computer code) provided on the computer screen, the teacher selects the phonogram(s) or spelling word(s) to be presented to the student. Pressing another screen button instructs the program to write the appropriate information onto a diskette (or into a student's folder if the operation is on a network).

The student then takes this diskette to a computer and has a tutorial (or remedial) session. If desired, the sounds associated with the symbols on the screen (either phonograms, syllables, or words) are heard through headphones rather than an auxiliary speaker in order that other classroom activities can proceed undisturbed. Other students can "plug-in" with other headphones for other remedial work at the same time, or later on their own if appropriate equipment is available, at the discretion of the teacher. The teacher also controls the hardware components to be used during the lesson. For example, Student A might best be served by using the mouse as the screen pointing device while Student B should use the graphics, or digitizing, tablet. All computers do not have to be identically equipped with the same communications devices as seen in FIG. 2c. An installation need only acquire the elements needed for the target student population. The simplest "system" is a single computer as shown in FIG. 2b.

The present method embodies a multi-sensory approach to teaching by which the student learns to associate the sounds of the language with their written symbols. They learn to write these "sound symbols," or phonograms, as well as to recognize, or read, them. The brain is actively engaged in the direction of the hand in producing the symbols, thus achieving the reinforcing benefit of the kinesthetic action of writing when performed on the touch-screen, graphics tablet, or with pen and paper. Both manuscript and cursive writing are taught using the method of the present invention.

It is recognized that each student employs these mental and physical tools differently in his learning process. Consequently, extensive flexibility is provided by the method to meet this need. A diagnostic test is administered to every student using the system. The test uses simple learning tasks and evaluation of each student's stimulus/response patterns to establish optimal cognitive learning modes. The teacher uses this information in combination with knowledge of the student's age and ability to determine lesson plans for the student. In the absence of a teacher, an alternative guideline based on the diagnostic test is used.

The rules of the language are introduced as they are needed to explain correct spelling and grammar. Simple sentences conveying meaningful truths and concepts are used to demonstrate the word in a sentence. Examples of such sentences are (the spelling words are underlined):

You are a fine person.
We stand for the Pledge of Allegiance.
Laughter cures many ills.
An isthmus connects two islands.

It is one objective of the method of the present invention to preserve and promote simplicity and directness. Although the teacher has control of the lesson, the attention of the student is held by providing him with control of the flow of his lesson and by allowing learning by discovery through the unstructured use of screen buttons. By clicking on the appropriate control icons at the bottom of the computer screen, he can, for instance, hear the sounds of the phonograms selected from the lesson set and shown on the screen, have the phonogram drawn in real-time, or have lines upon which the letter(s) of the phonogram are written or drawn (in proportion to how they would appear on ruled paper) drawn or removed. In each instance, the sound of the phonogram (or spelling word) is heard. Other icons may be selected as is appropriate, such as recording his pronunciation of the phonogram (or spelling word) and immediately being able to hear his voice from the computer upon clicking the screen button associated with this activity. Accuracy is obtained by comparing this recording with the previously recorded standard sound for that phonogram (or spelling word).

The method of the present invention includes the ability to capture a student's performance. These data are date-stamped and timed, as appropriate, and available to the teacher for evaluation of progress over time.

Besides providing actual use data, the method analyzes the data and suggests what needs to be done in a later session on the computer. The organization and structure of the method thus allows for prescribed, self-directed usage.

The methodology used in the present invention is based on combining the five independent CHANNELS OF LEARNING 114–122 and the components 104–112 of the computer based instructional system, see FIG. 1, into an almost unlimited number of cognitive strategies so as to provide an optimal strategy for achieving a target educational objective. The strategies are composed by the system using information stored about each student's learning capabilities and styles. As shown schematically in FIG. 1, the learning channels by which computer 100 and student 102 interact (through the respective SYSTEM COMPONENTS 104–112 listed in FIG. 1) are the aural 114, the oral 116, the visual 118, the kinesthetic 120 (e.g., typing, writing, or hand signing), and tactile 122 (as when the unsighted learner uses electronic braille devices as a substitute for the visual channel of learning). The teacher is not required, a priori, to determine which combination represents the optimal cognitive strategy for a given student. Instead, a preliminary evaluation of the student's skills is conducted using computer-generated stimuli requiring a response from the student and the above-described stored data, if any, indicating the student's previous performance(s). A person might have a deficiency in one particular sensory or motor learning channel, for example, vision. In this case, one or more of the student's other learning channels naturally pick up the tasks of absorbing and utilizing information. In addition, and in a unique attribute of the method of the present invention, these independent channels become intertwined and form new ways of learning. In the process, weak channels become stronger through being involved, even if in a limited way, with the learning activity. Handicapped students deprived of one or more channels can still learn through compensatory mechanisms.

Figure 2A:
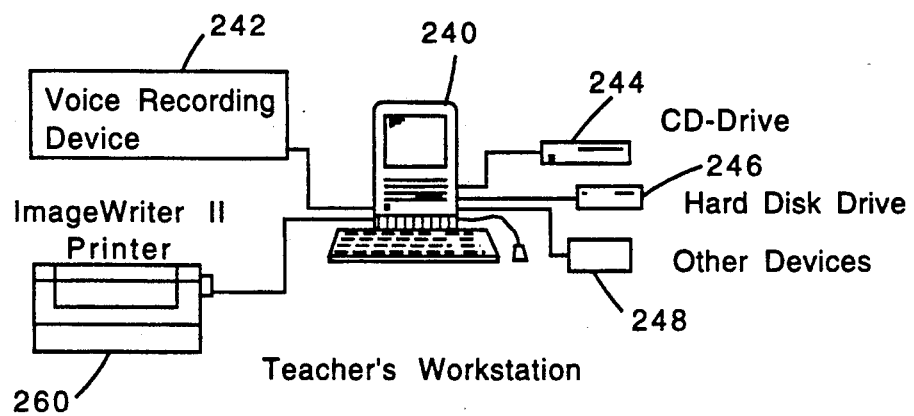
FIG. 2a is a schematic representation of a teacher computer 240 or workstation. This system configuration normally has more hardware components than the student's system. "Other Devices" 248 refers to components available to the teacher, such as touch screens, track balls, etc.
Figure 2B:
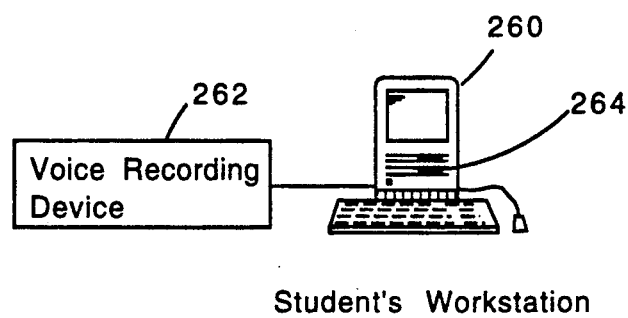
FIG. 2b shows a student's computer 260. It has a component 262 to digitally record the student saying the phonograms, word, or other task objective and depicts the simplest system hardware configuration from among an almost unlimited number of possibilities. A typical networked computer lab having various hardware components which might be utilized to advantage with the method of the present invention is shown in FIG. 2c. Also shown in this figure are several hardware components which facilitate the teaching of communication skills. For example, the video camera 2081 provides for the assessment of the lip positions during speech, or in the case of a deaf learner, for recording and evaluating the student signing the lesson objective. The current invention is not limited to particular computers or system configurations.
Figure 2C:
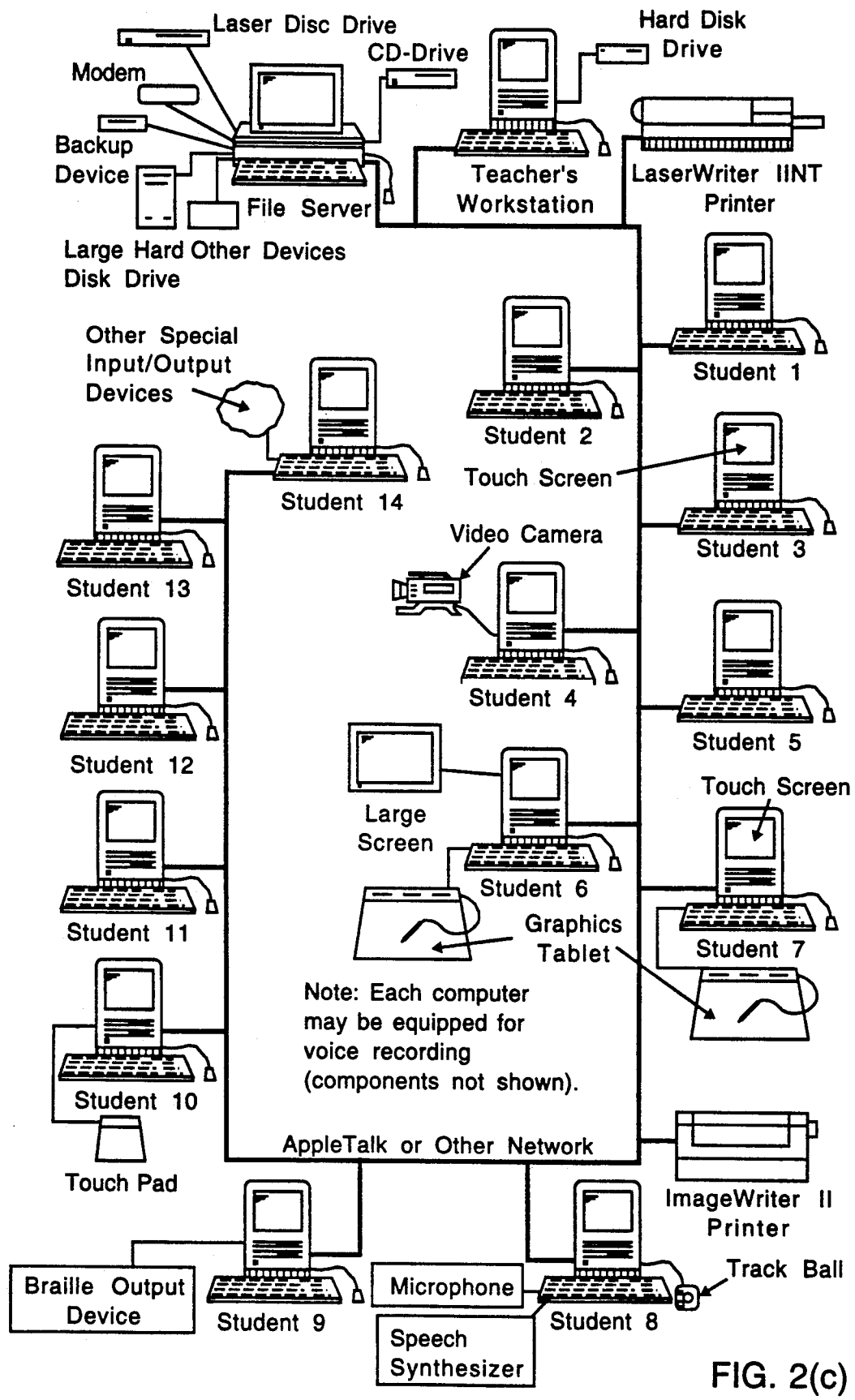

The five independent CHANNELS OF LEARNING 114–122 incorporated in the methodology of the present invention utilize computer components, see FIGS. 2a–2c. Outside of classrooms, the system configuration will most likely be that shown in FIGS. 2a–2b. Some SYSTEM COMPONENTS, such as track balls and voice recording devices, are not shown for clarity. In some cases the system in FIG. 2a may serve both the teacher and student, as in the case of private use of the methodology of the present invention in the home.

Many installations involve multiple users, such as in a classroom. While not required, classroom users may use networked SYSTEM COMPONENTS, as in FIG. 2c. In the preferred embodiment described herein, Apple MACINTOSH TM computers using HYPERCARD TM are utilized as both teacher computer 200, 201 or 240 and student computers 202–228 and 260, but the method may be implemented on equivalent computer platforms with equivalent capabilities and different operating systems. For single user installations, see FIGS. 2a–2b, the following is a preferred configuration of a system involving phonograms and spelling words; any component has one or more equivalents:

Teacher's Computer:
Apple MACINTOSH TM SE/30 40HD 240
Apple External Hard Disk 80SC (or higher) 246
CD-ROM Drive 244
Apple IMAGEWRITER TM II Printer 260
Farallon MACRECORDER TM Sound Digitizer and Software 242
Other Devices 248, such as track balls, etc.
Students' Computer:
Apple MACINTOSH TM Classic or LC 260
At least two disk drives 264

Farallon MACRECORDER ™ Sound Digitizer and
Software 262

For classroom use, a possible network installation for use in accordance with the method of the present invention is shown in FIG. 2c. In the preferred embodiment, each student's computer 202-228 has at least two disk drives, one to hold HYPERCARD ™ and the other the individualized lesson disk. Hard disks may be added if storage requirements for the lessons become too great. In the following list, the preferred system is described in terms of the equipment required for a system having the capability of utilizing phonograms and spelling words; any component has one or more equivalents:

Teacher's Computer:
Apple MACINTOSH ™ II 160HD 200, or
Apple MACINTOSH ™ SE/30 160HD 201
Apple External Hard Disk 400SC (or higher) 2005 or 2011
CD-ROM Drive 2001
Apple LASERWRITER ™ Printer 232
Farallon MACRECORDER ™ Sound Digitizer and Software
Student's Computer:
Apple MACINTOSH ™ Classic or LC 202-228
Two disk drives
Farallon MACRECORDER ™ Sound Digitizer and Software
Apple IMAGEWRITER ™ II Printer 230
An alternative system configuration is:
Apple MACINTOSH ™ II (or equivalent or higher) 200
Apple Internal 1 GB Hard Disk (or higher) 2005
Apple LASERWRITER ™ Printer 23
CD-ROM Drive 2001
Modem 2003
BackUp Device 2004
Laser Disc Drive 2002
Other Devices 2006, such as track balls
Farallon MACRECORDER ™ Sound Digitizer and Software
National Instruments (for the Apple MACINTOSH ™)
NB-A2100, Audio Frequency Analog I/O Board
LABVIEW2 Software System The number of student computers 202-228 is varied as is needed. Each is preferably provided with a set of headphones with a built-in boom mike (not shown). Other headphone/microphone combinations are also possible. The headphones are plugged into the back of the computer 202-228 so that the student can hear the lesson without disturbing the rest of the class; however, the mike jack is plugged into the sound sampling plug or into the sound digitizer if a separate unit is used. Each computer need not be equipped with the same peripherals. Only those interfaces that are required for the target student population need to be considered.

Figure 3:
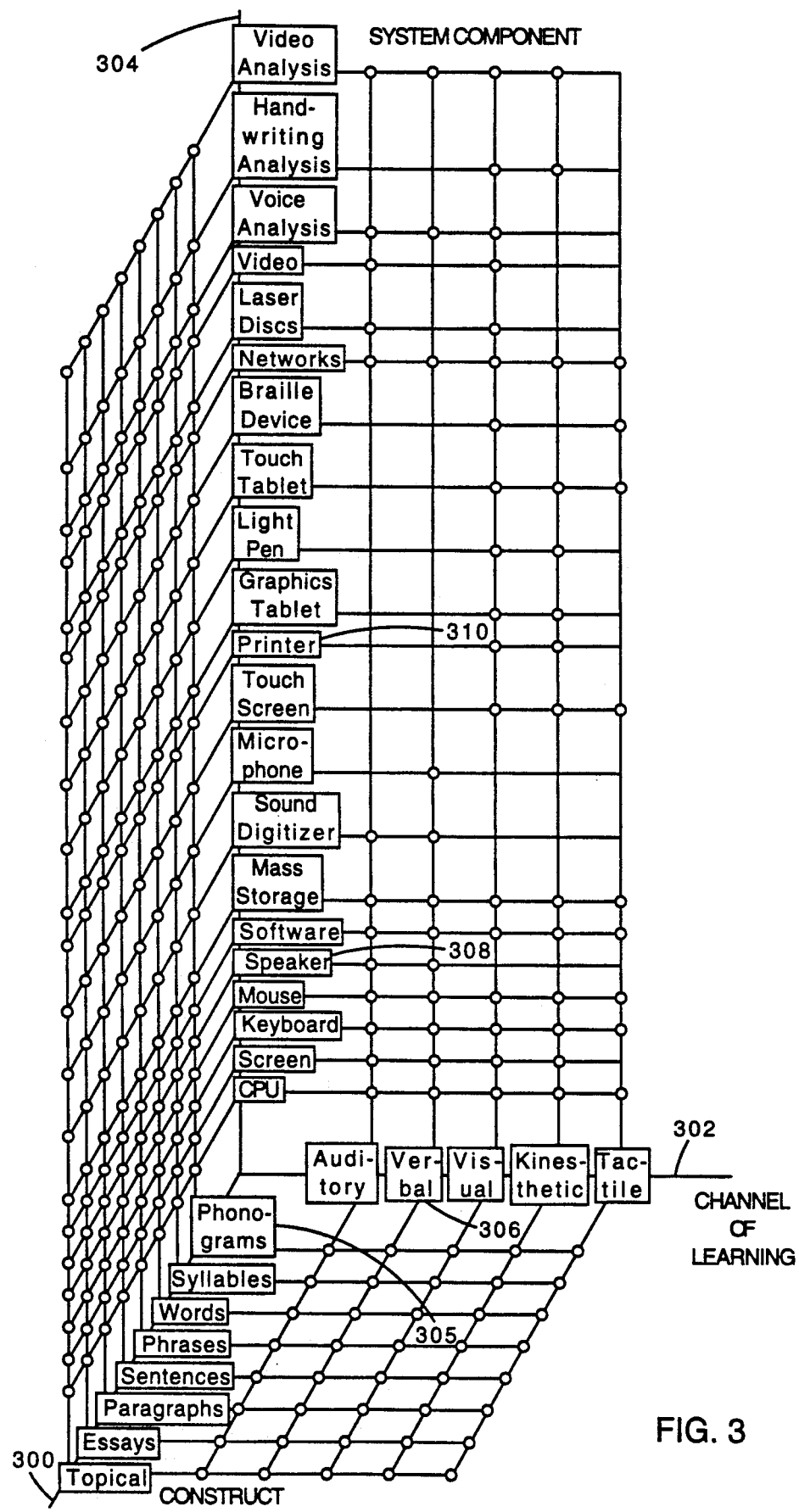
FIG. 3 is a three-dimensional depiction of the various combinations of hardware, target objectives/constructs, and channels of learning which can be utilized in accordance with the method of the present invention. The circles at the intersections of the grids depict the possible combinations of system elements. For example, the Verbal 306 CHANNEL OF LEARNING makes use of a speaker 308, but not a printer 310. Any CONSTRUCT 300 is used in all CHANNELS OF LEARNING 302. Any SYSTEM COMPONENT 304 is used with all CONSTRUCTS 300. Not all SYSTEM COMPONENTS 304 are used in every CHANNEL OF LEARNING 302.

The method of the present invention is capable of taking a non-reading student all the way through to a skilled user of a language able to assimilate information and express ideas and concepts. As described above, after preliminary evaluation, numerous approaches may be taken to reach that objective based on the needs of the student and the hardware components available. The large number of approaches is depicted in FIG. 3. As shown in FIG. 3, the method embodies three major facets, namely, CONSTRUCTS, SYSTEM COMPONENTS, and CHANNELS OF LEARNING.

The CONSTRUCT axis 300 takes the student from Letters (Phonograms) to Syllables to Words to Phrases to Sentences to Paragraphs to Essays to Topical material. This is the language content axis. The CHANNEL OF LEARNING axis 302 embodies the independent avenues of learning that are available to the student using the method of the present invention. These channels include the Auditory, Verbal, Visual, Kinesthetic, and Tactile channels of learning. This is the personal capability axis.

The SYSTEM COMPONENT axis 304 shown in FIG. 3 includes the hardware components that facilitate the learning process described above. These components can include the CPU, computer screen, keyboard, mouse, speaker, software, mass storage devices, sound digitizer, microphone, touch-screen, printer, graphics tablet, light pen, touch tablet, braille device, network hardware, laser discs and associated playback equipment, video devices, voice analysis hardware and software, speech and sound synthesizers, handwriting analysis hardware and software, and video analysis hardware and software, some of which are depicted in FIG. 2c. These components comprise the physical system axis.

Having described a system including a digital computer 200 having processing, storage, input and output means that is utilized in the method of the present invention, reference is now made to the software run by the computer 200 and shown in FIGS. 4-7 and FIG. 10. As discussed above, as a preliminary step in the method of the present invention, the individual student's skills are evaluated in the EVALUATE module 400 using computer generated stimuli requiring a response from the student, see FIG. 12, and any data indicating the student's previous performance which may have been stored in the system.

Figure 4:
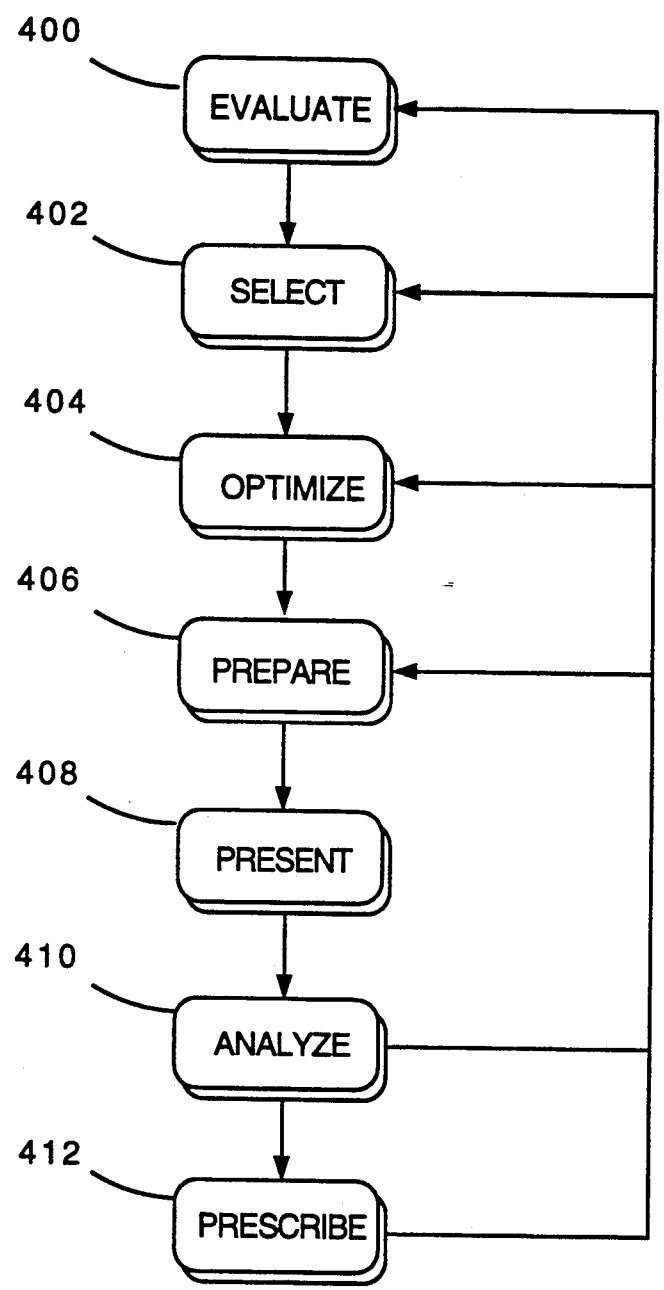
FIG. 4 is a flow chart showing the steps of a presently preferred embodiment of the method of the present invention; the figure also sets out the program logical sequence of the software described herein. The teacher has the option of using her training and experience to bypass the EVALUATE 400, SELECT 402, OPTIMIZE 404, ANALYZE 410, and PRESCRIBE 412 elements if desired. An alternative preprogrammed guide is available to the teacher.
Figure 6A:
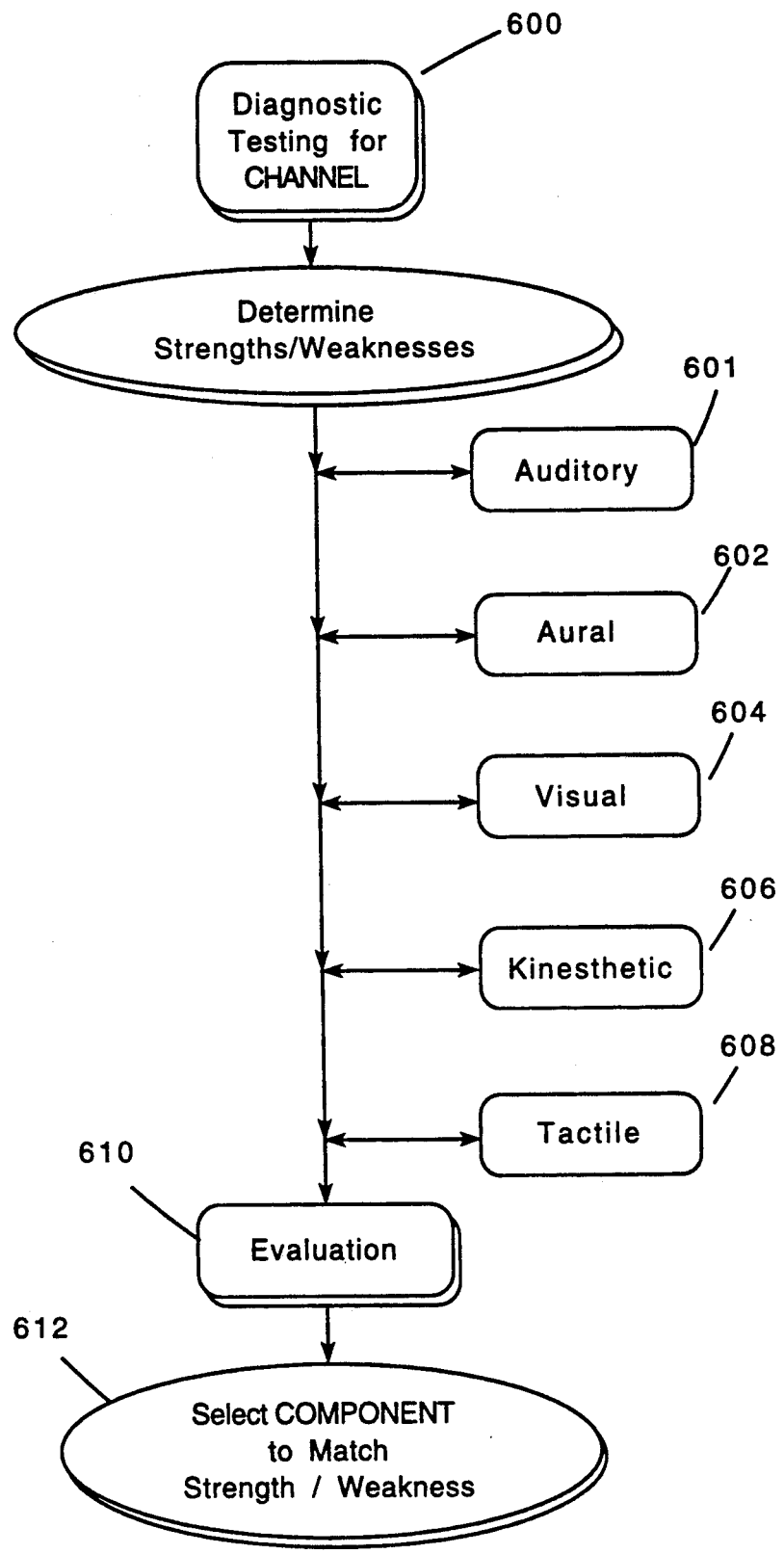
FIGS. 6a–6d provide additional detail for the steps of the method set out in FIG. 4.
Figure 6B:
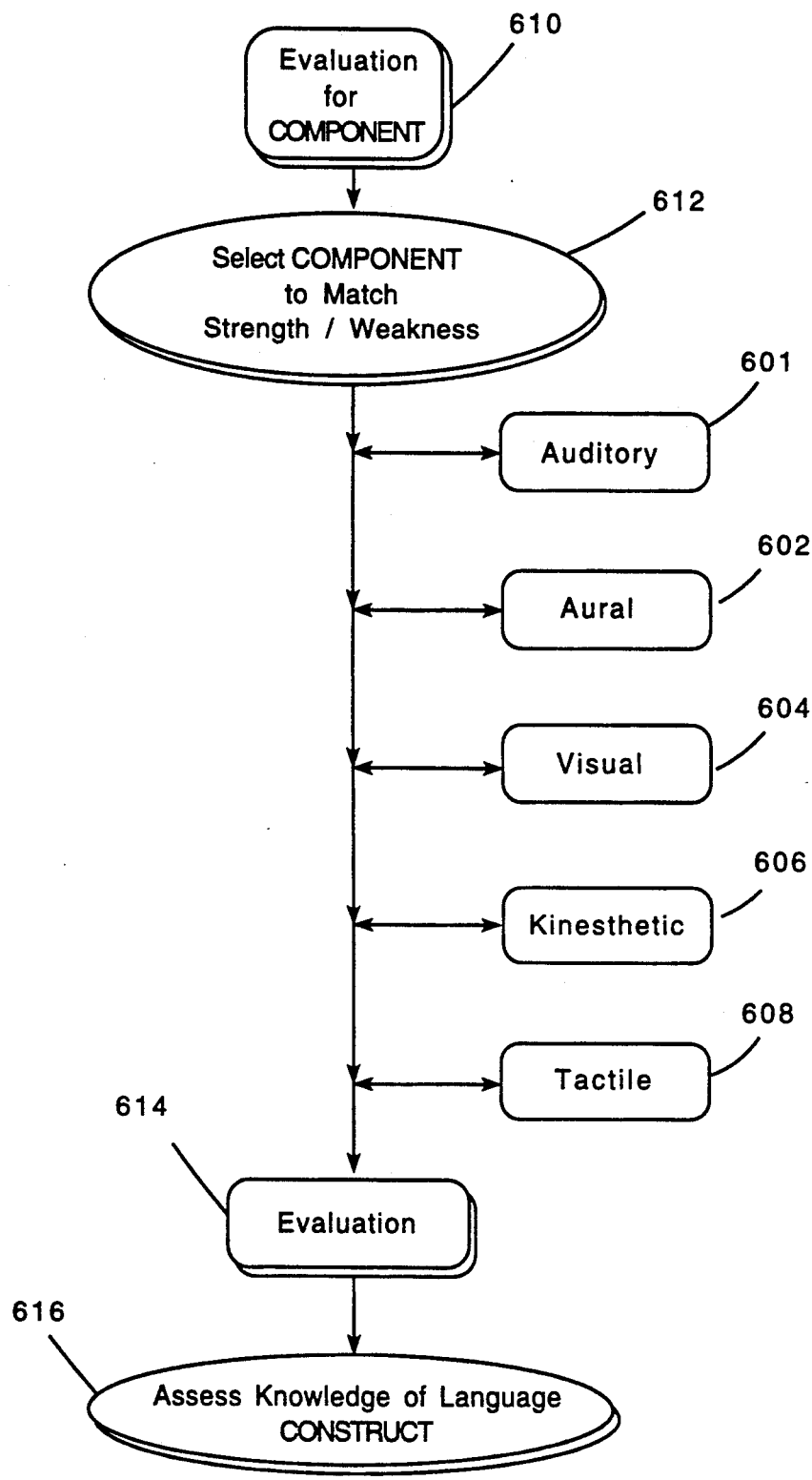
Figure 6C:
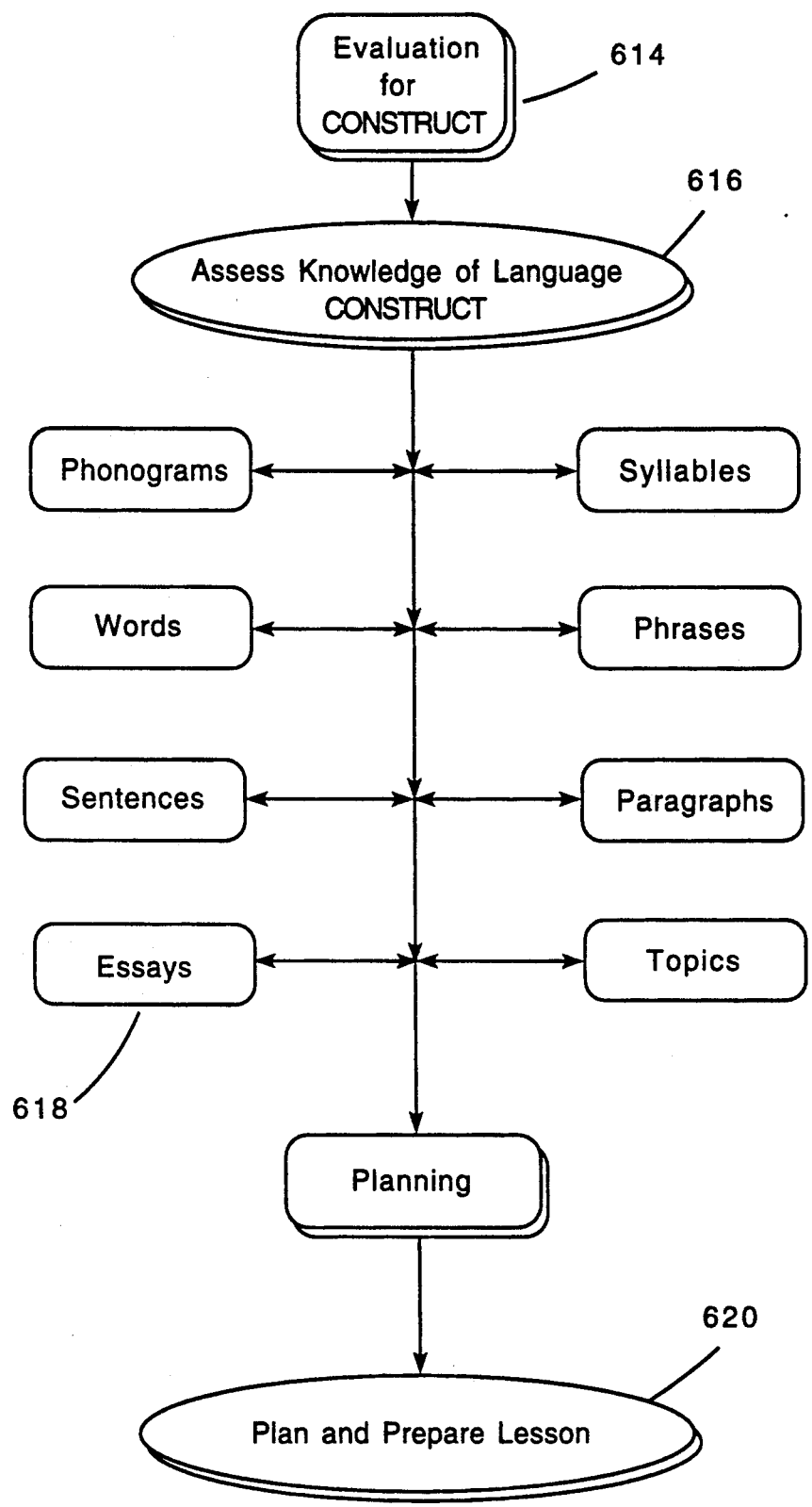

This preliminary evaluation is accomplished by exposing the student to a hierarchy of stimuli in each possible learning mode while recording and evaluating his responses as shown in steps 400-412 of FIG. 4. The initial stimuli are auditory as shown in FIGS. 6a14 6b. Using the previously saved digitized sound and the speech synthesizer, a sound such as a long vowel sound is produced and the student is asked to reproduce the sound, e.g., "Ahh, please say ahh." The student's response is then compared with a prerecorded sequence of "ahh" by comparing the digitized waveform of the student's response to a predetermined program standard selectable by the teacher. It can be, for instance, regional (e.g., Eastern U.S., Southern U.S., etc.), male or female, etc. This comparison is made using criterion reference rules, as in FIG. 12, by which selected elements of the student waveform are compared to the program waveform and assigned numerical weights based on similarity. If the student's response is within the acceptable range of performance, the student progresses to more complex auditory stimuli using more letters, including consonants, syllables, words and sentences. The system evaluates each response and proceeds to the next component of the examination when the student makes repeated errors in response, the number of repetitions and the time required being suggestive of the extent of the learning deficiency. If no errors are made, the system stores the student's responses and proceeds to the next objective.

As shown in FIGS. 6a–6g and FIGS. 12a–12c, the student's visual perception and acuity is then tested by, for instance, asking him to identify various symbols or figures. Shown a group of simply drawn faces or differently colored balls on the monitor, the student might be asked, "Touch the smiling face" or "Touch the red ball." If a teacher has any reason to think the student's visual acuity is compromised, a simple acuity test is provided.

This test can be performed at graded levels depending on the student's knowledge of alphanumeric characters. Another portion of the evaluation tests kinesthetic responses as shown in FIG. 12c. The student is shown an animated sequence of a student using a graphic tablet or touch screen. A hand drawing of a figure is then shown on the monitor. The student is asked to draw the same figure on the available medium. For instance, the speech synthesizer might be used to generate the statement, "This is an 'O'. Please trace an 'O'." The student's response is tested against the standard pattern. In this example, the student is expected to draw a curved line closing upon itself with the ratio of semi-major and semi-minor axes within a specified range. Upon successful completion, the student may progress to drawing more complex shapes.

At the completion of the EVALUATE module 400 of the system software, FIG. 4, a set of instructions is output for storage to memory and subsequent call-up for use in identifying an optimal cognitive strategy for achieving a target instructional objective. The output of the EVALUATE module 400 is used to configure the system resources in the SELECT module 402. Here the results of the evaluations are used to identify preferred system components 304. If the thrust of the lesson is to reinforce deficient channels of learning and if they are not present, the inclusion of particular system components 304 which utilize those channels as shown on the construct axis 300 in FIG. 3 may be requested of the system administrator, or teacher. The operating system software recognizes which items have been attached and available to the student.

The target instructional objective for mastering a language construct is then selected from the several hierarchically ranked constructs which appear on the construct axis 300 of FIG. 3. The target objective is either selected by the teacher supervising the use of the system or it can follow sequentially in the hierarchy from a previously mastered target objective, the results of a previous lesson having been stored to system memory for call-up in the absence of an external selection.

Figure 5:
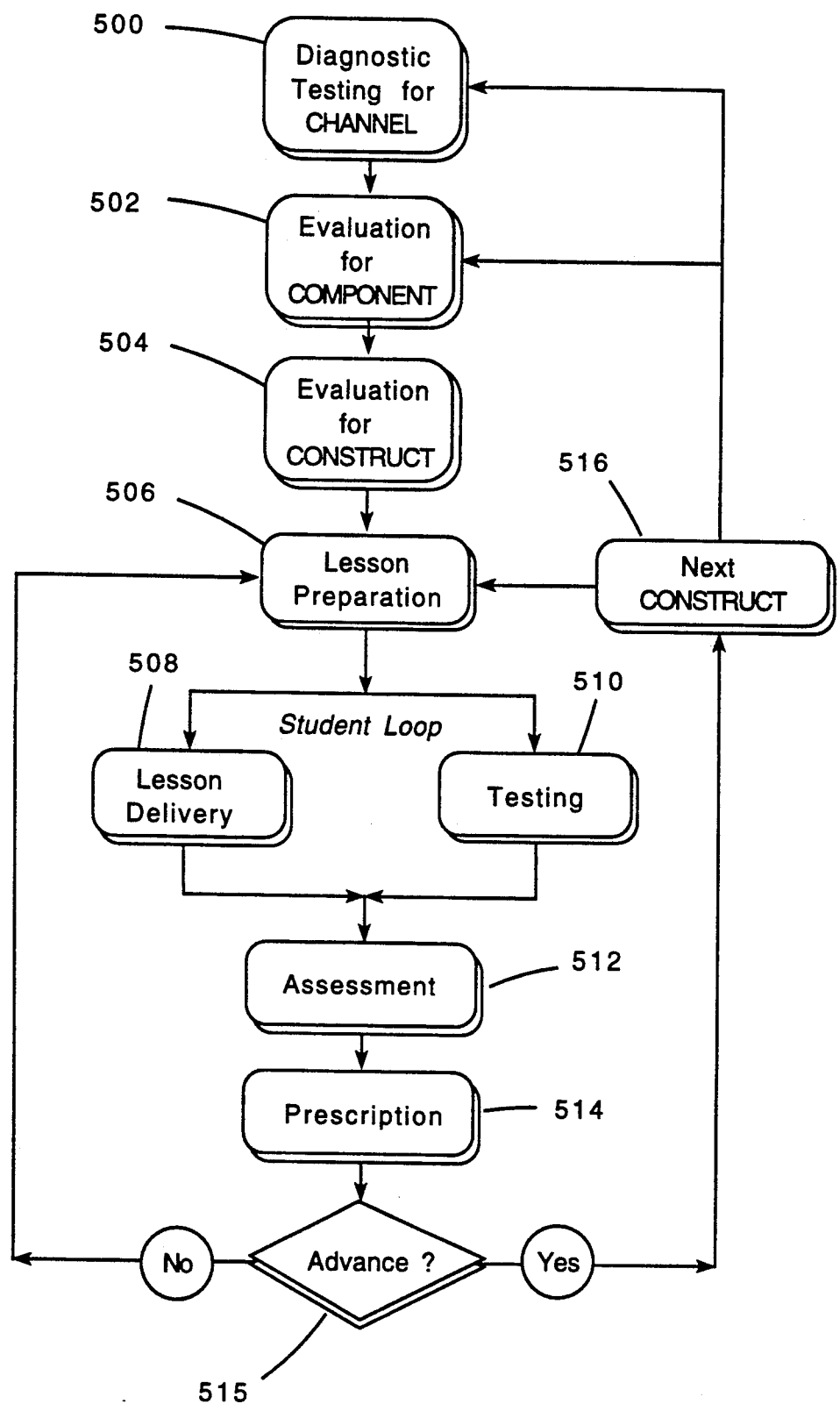
FIG. 5 is an expanded form of FIG. 4. It shows the two paths 508–510 available to the teacher for presenting or testing understanding of the material. The Preparation step 506 is defined in more detail in FIG. 6d.

The above-described output of the EVALUATE 400 and SELECT 402 modules and the data from the student's previous performance(s), if any, are used to identify an optimal cognitive strategy combining a plurality of the available CHANNELS OF LEARNING and SYSTEM COMPONENTS for achieving the target objective with the greatest efficiency and student retentivity. This optimal strategy is identified in the OPTIMIZE module 404, FIG. 4, by employing alternative combinations of learning channels in iterative fashion using stimuli, expected responses and evaluation criteria identified in FIGS. 12a–12c. The stimuli, responses and criteria listed in FIGS. 12a–12c are representative, but not exclusive. Pre-programmed stimuli are selected in accordance with the optimal cognitive strategy and prepared (step 406) for presentation (step 408) to the student by the SYSTEM COMPONENTS 304 selected by first determining the preferred CHANNEL OF LEARNING 302 as seen in FIG. 5. Diagnostic testing 500 for CHANNEL 302 to select the COMPONENT 304 is represented in step 502; testing to select the CONSTRUCT 300 is shown in step 504. This selection is followed by presentation of a lesson 506, represented generally by step 406 in FIG. 4. The lesson is presented in step 508 following the sequence at 408 in FIG. 4 and the student is tested as shown in step 510. The student's test responses are analyzed as in step 512 following the sequence at 410 in FIG. 1. The results of the analysis are compared to the present parameters in the prescription step (514) and a determination is made regarding whether the student should advance 515 to the next CONSTRUCT 300 at step 516.

The first CHANNEL 302 tested at step 600 is the Auditory 601 channel as shown in FIG. 6a. This test is repeated for the remaining CHANNELS 602–608, evaluating 610 each CHANNEL to select the SYSTEM COMPONENTS 304 appropriate to match student strength or weakness 612 according to optimization criteria used in step 404, i.e., FIG. 4. For instance, visual stimuli are not prescribed for a blind student.

The continuation of the process is shown in FIG. 6b. Once the SYSTEM COMPONENT 304 is selected, the CHANNELS 601–608 are selected in sequential fashion and utilized to obtain student response data for evaluation 614 to assess 616 student knowledge in a language CONSTRUCT 300. The continuation of the process follows in FIG. 6c. The assessment of language CONSTRUCT 300 may be in any one or combination of the individual CONSTRUCTS shown in 618. The results of this assessment are utilized to plan and prepare 620 the lesson as shown in step 406.

Figure 6D:
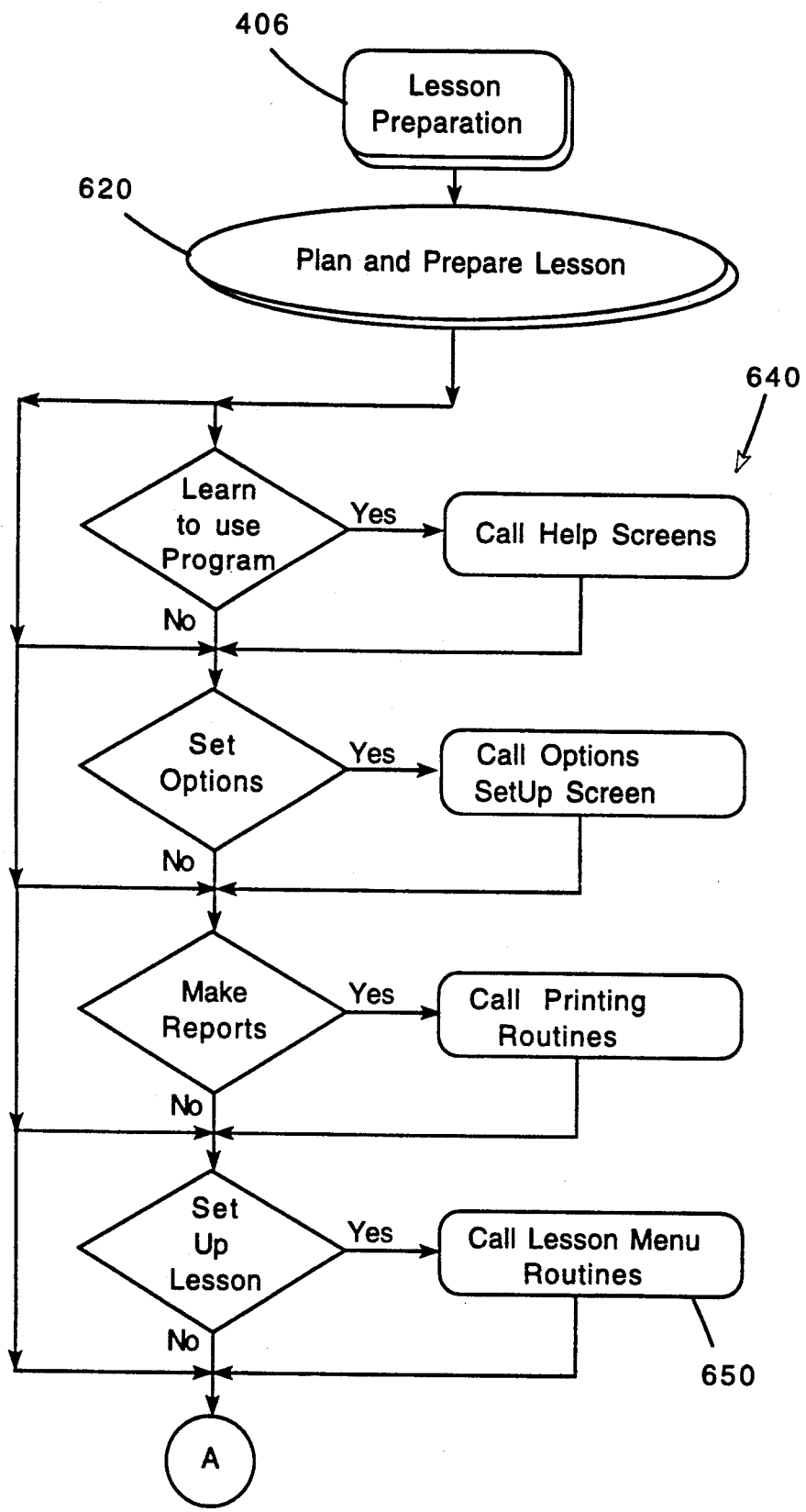
Figure 6E:
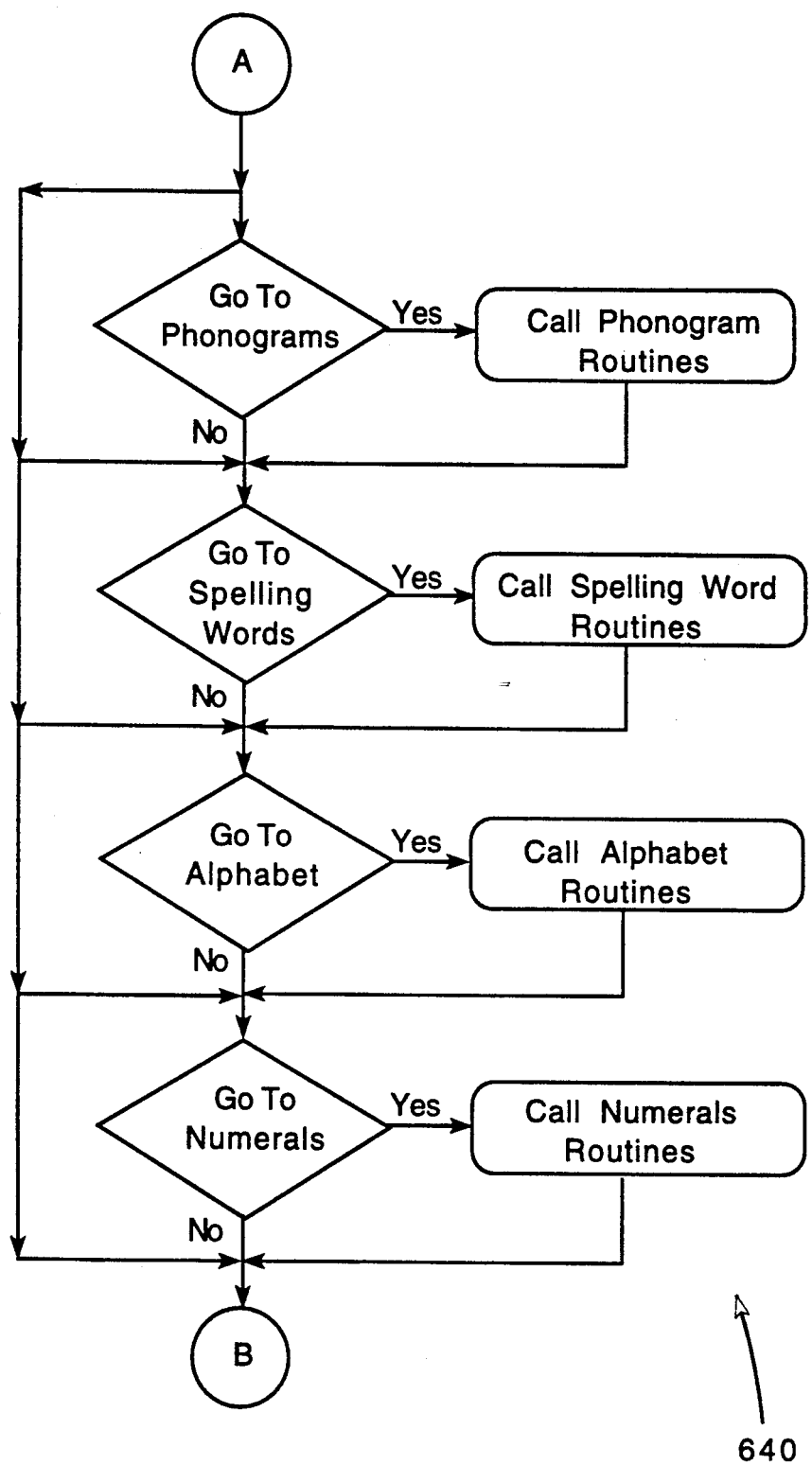
Figure 6F:
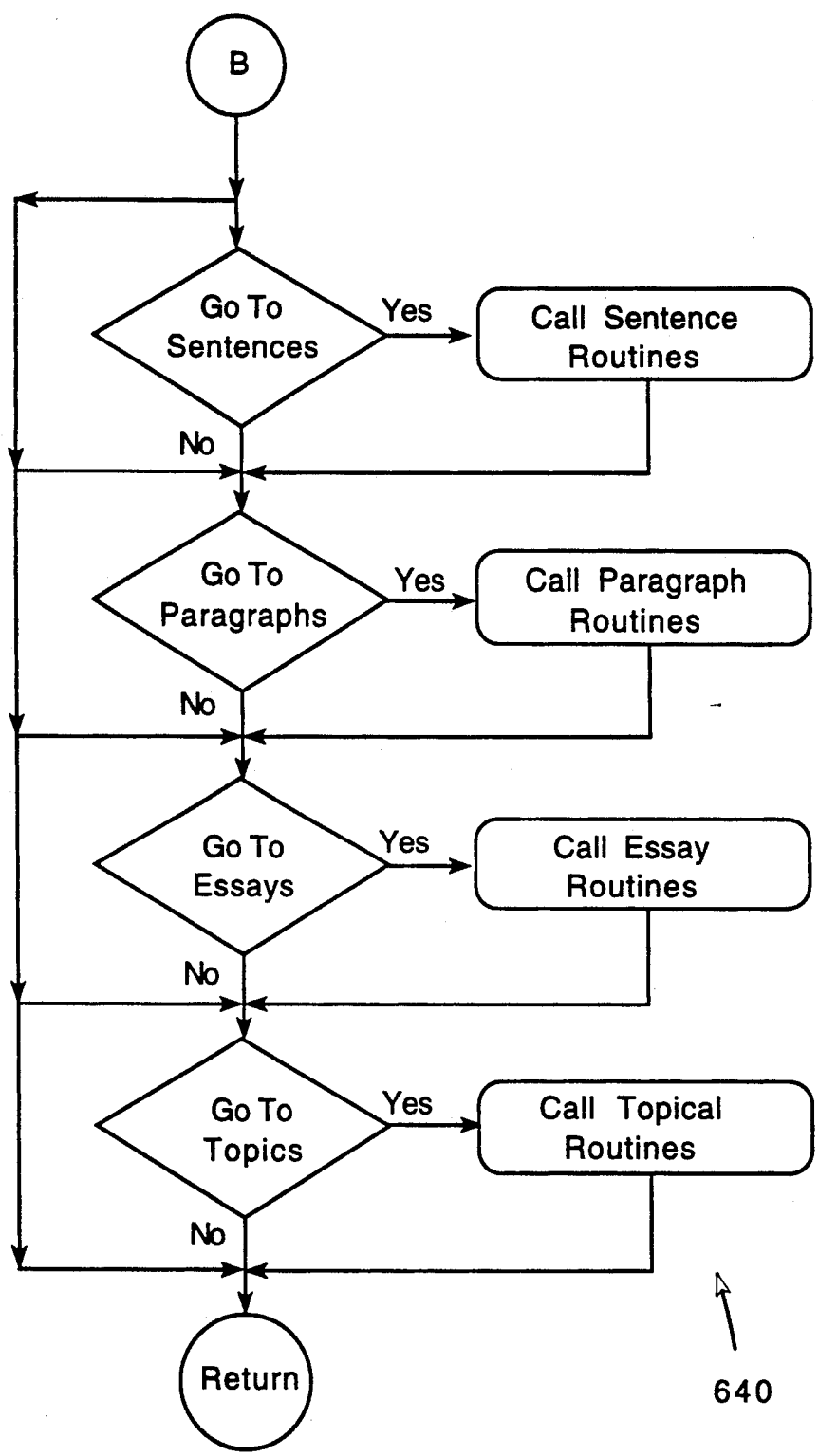

The depiction of the lesson preparation process of module 406 is completed in FIG. 6d–6f. The lesson preparation module 420 is used to prepare the particular lesson 620 from pre-programmed material shown in the flow elements 640 of FIG. 6d–6f. Each flow element is accessed as a result of a series of sequential binary decisions entrained by the program logic to prepare the lesson according to the predetermined criteria defined by the system optimization to present the lesson according to the student's diagnosed cognitive profile and fitting his level of advancement, e.g., the match referred to in step 612.

Figure 6G:
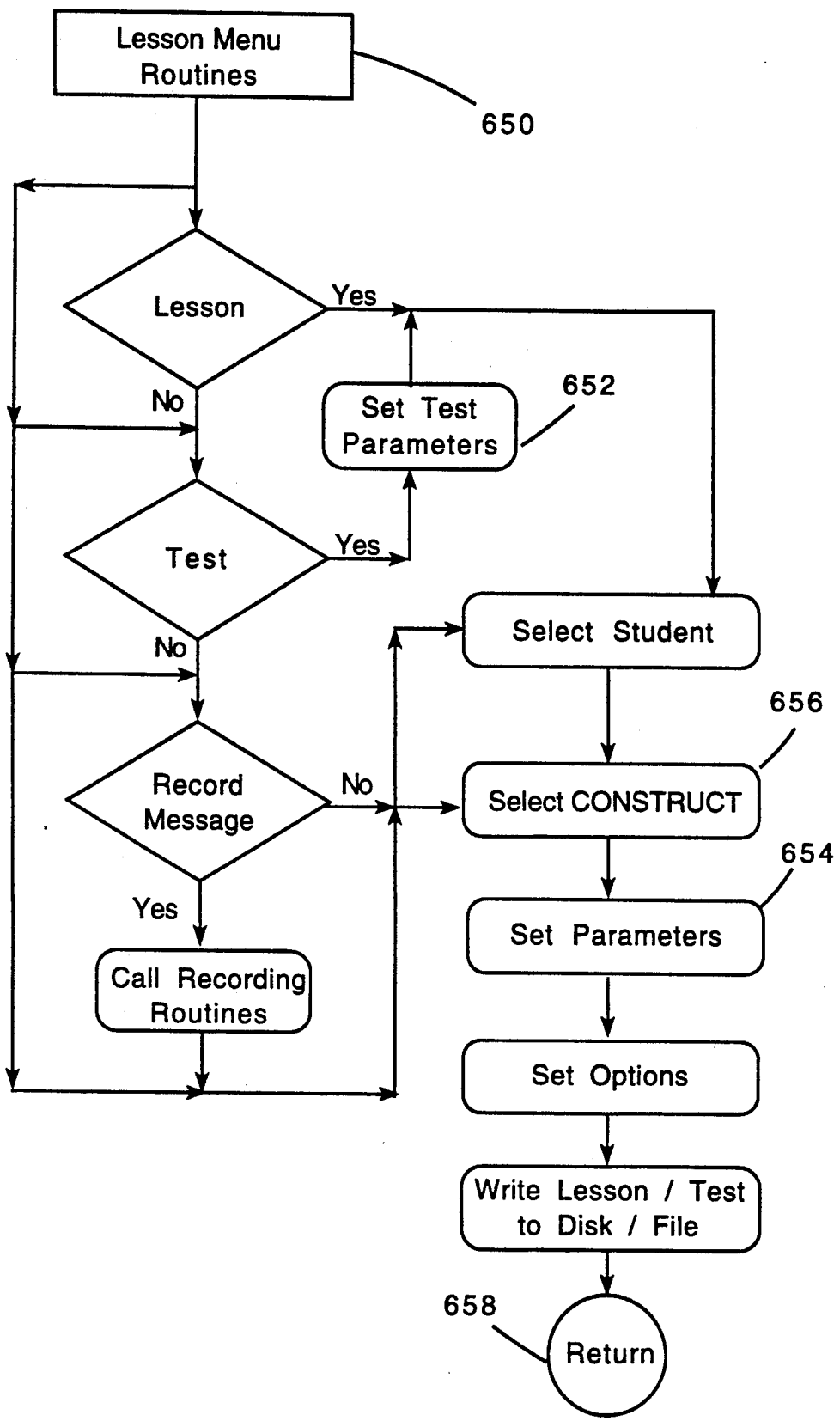

The uses of the lesson menu routines 650 of the flow elements 640 are shown in FIG. 6g. Representative examples of these flow elements are discussed infra, in connection with the discussion of the display screens described in the examples. These routines are accessed by the program to embed stimuli, construct presentation modes, and response modes, such as message recording in lesson presentation, following the hierarchical menu structures used to facilitate student-system interaction.

In FIG. 6g, the step, "set test parameters" 652 indicates "lesson parameters", namely parameters determining repetition of stimulus, allowed variance in response and the like. The select CONSTRUCT step 656 refers to a particular output of Module 402; e.g., words phonograms, syllables, etc. The return 658 is to the program step leading to the successor module to PREPARE 406, namely PRESENT 408. The parameters required in step 654 are those specifying particular constructs 300; e.g., specific words, phonograms, syllables, etc.

Figure 7A:
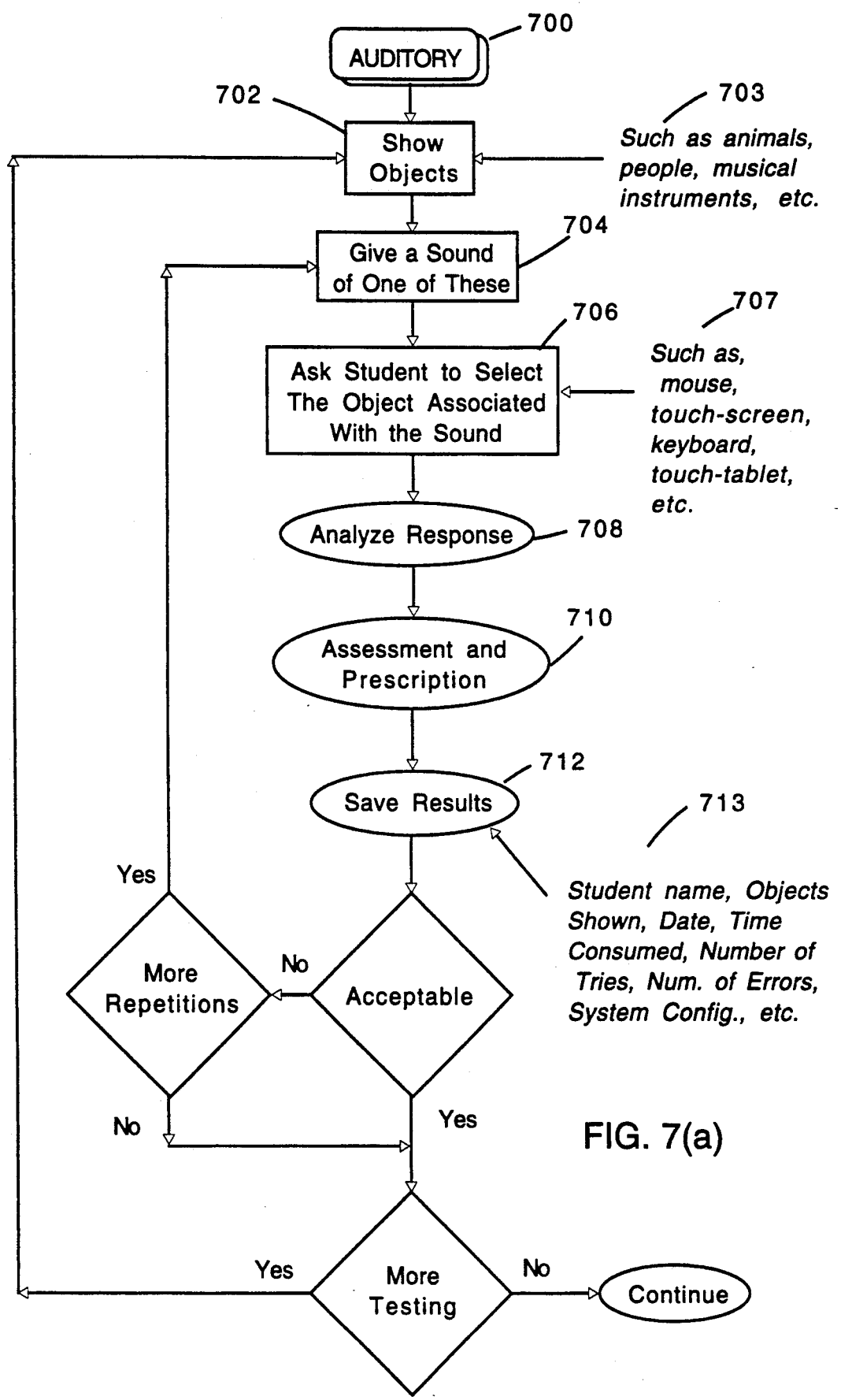
FIGS. 7a-7d provide a summary of the steps involved when each of the four CHANNELS OF LEARNING of sound, sight, speech, and movement are utilized in accordance with the method of FIG. 4.
Figure 7B:
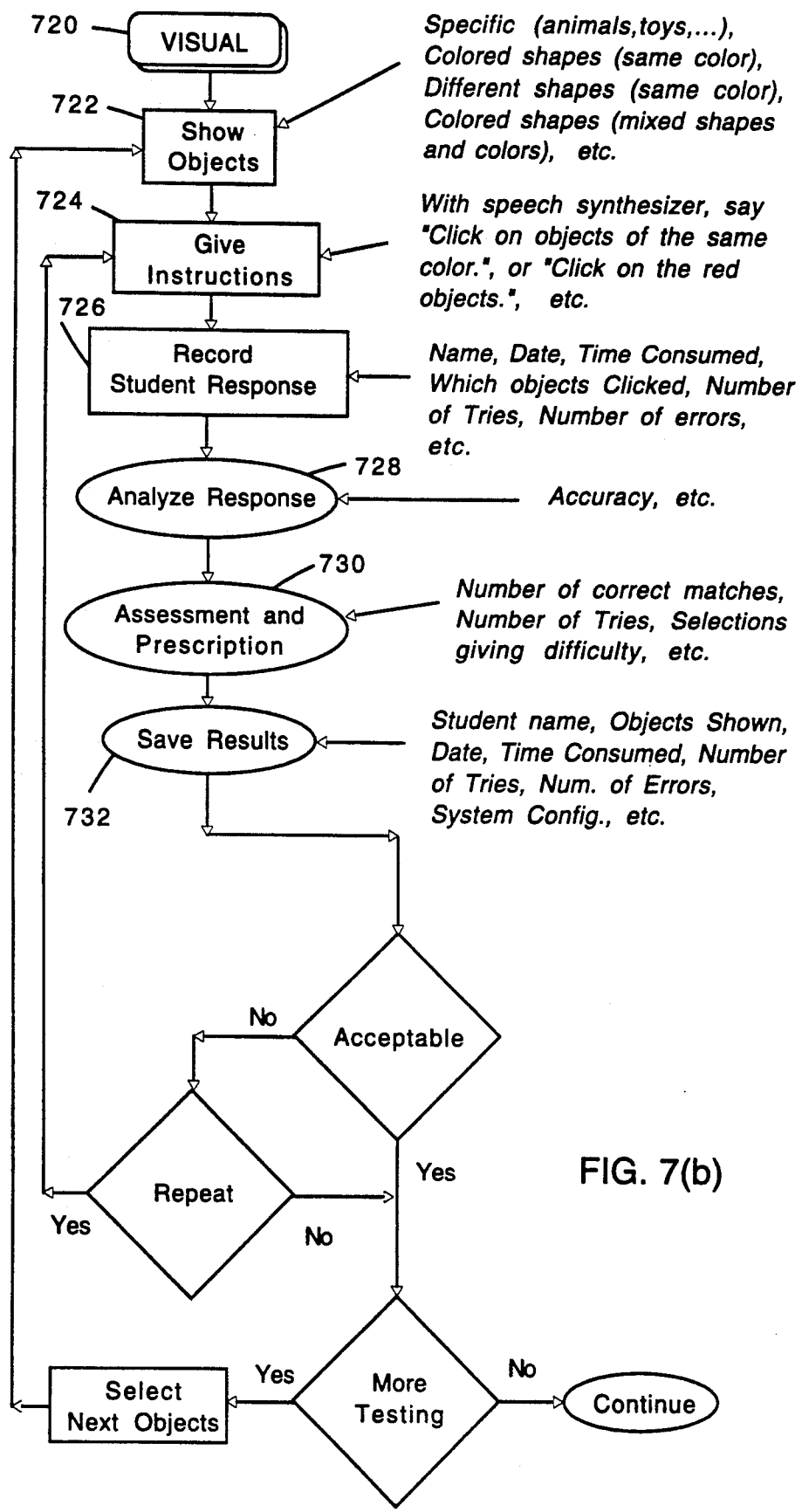

A more detailed breakdown of these processes is depicted in FIG. 7a. The steps 402 through 712 are steps in the method for associating auditory responses to visual stimuli, capturing and analyzing the student's response, assessing the response according to preset criteria and saving the results 712. Rather than describe each of these steps in repetitious detail, the analogous steps for the VISUAL CHANNEL 720 in FIG. 7b are described infra.

When testing for auditory strengths and weaknesses, objects such as musical instruments, animals, and people, are shown on the computer screen. The computer gives the sound of one of these items and asks the student to identify by clicking on the item associated with the sound. The student can use any of the input devices attached as a system response. These include, but are not limited to, a mouse, touch screen, keyboard, and graphics tablet. The time it takes to select the correct match is recorded by the system software and stored in memory. Other data stored include the student's name, date, number of incorrect selections, item most often selected, etc.

Figure 7C:
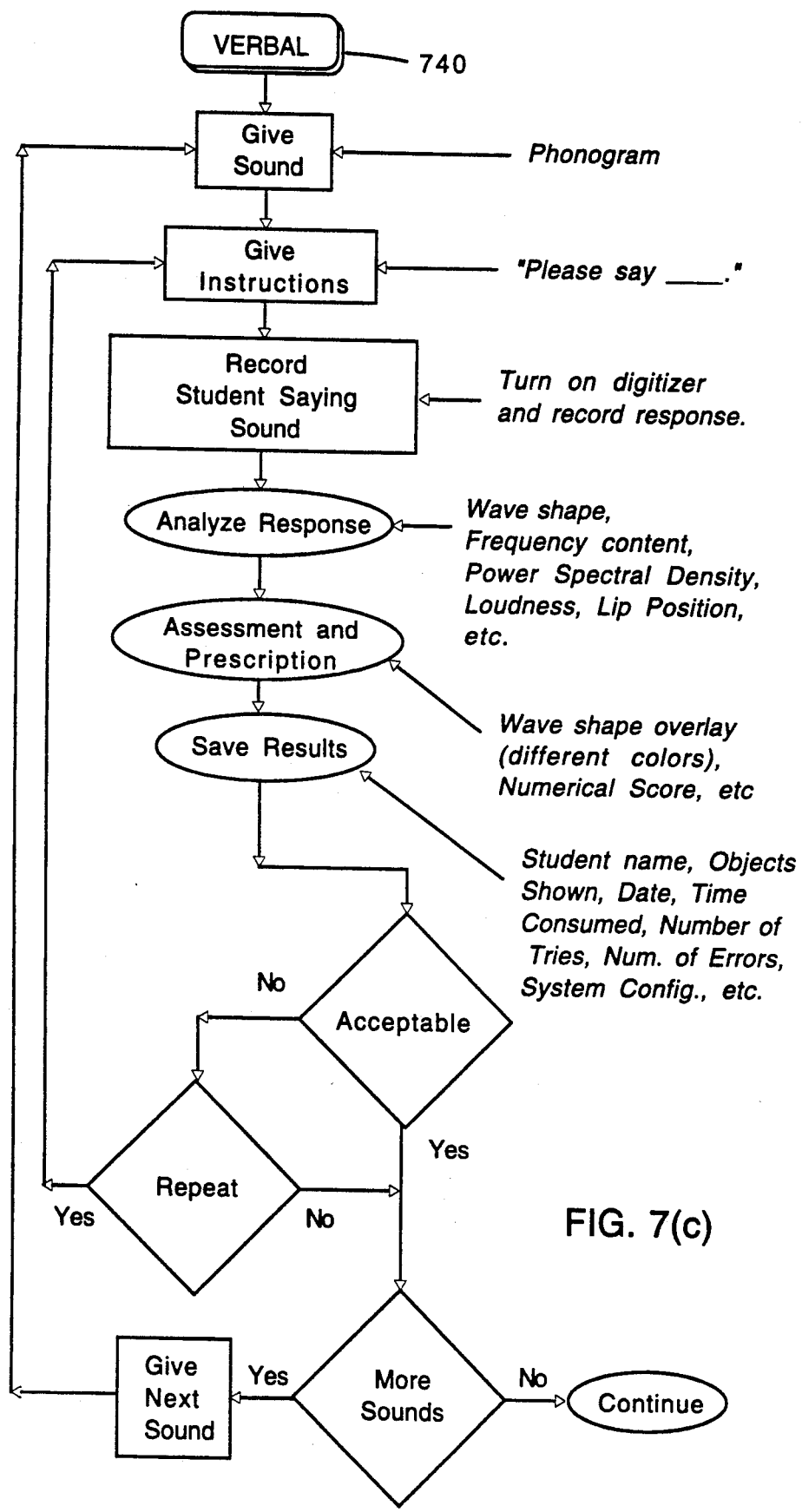
Figure 7D:
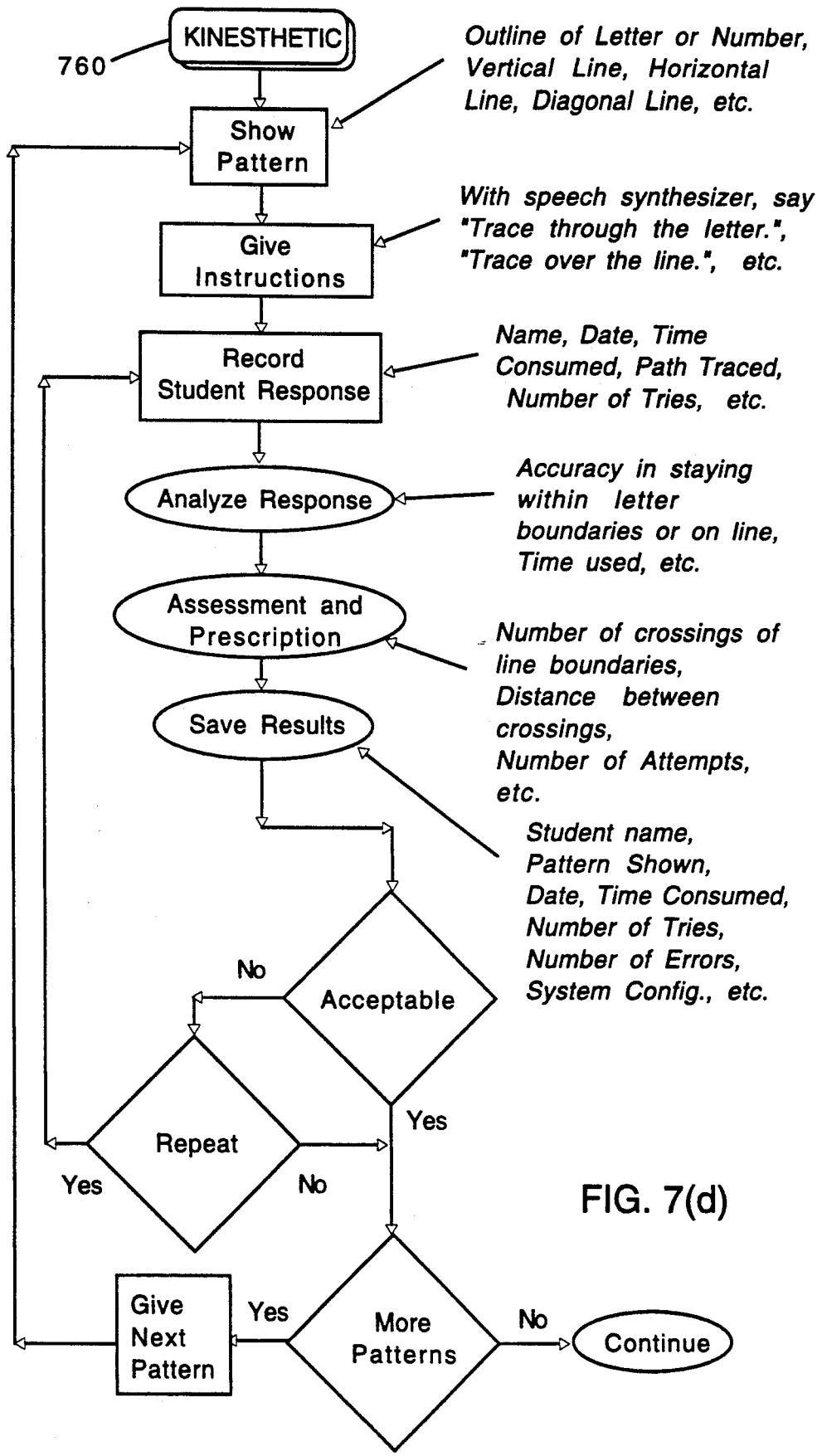

The response is then analyzed referring to (step 410 of FIG. 4) by comparing the student's response with performance standards stored in memory. These standards are appropriate to the age of the student. The number of correct first tries measures receptive hearing ability of the student. Time required to make a choice suggests confusion with certain sounds. This confusion may be due, for instance, to lack of experience with the source choices shown on the screen or a hearing deficiency. These sounds become part of the Verbal channel test (FIG. 7c). Prior to that, other sources which might make that same sound, if available, are offered. Otherwise, sounds similar to that causing difficulty are offered to the student. Repeatability is measured by repeating the sound on a randomly selected schedule. Retentivity is measured by including the sound in later tests of this student. As retentivity is demonstrated, the sound is removed from the file which contains the sounds which the student has shown inconsistency in matching the sound with its source.

If more than expected incorrect first choices are documented, a PRESCRIBE module 412 is entered in which a program of remedial teaching with the indicated sounds and sources is indicated. If the student has demonstrated that he is more accurate when using a particular SYSTEM COMPONENT in making selections, this COMPONENT is noted and used to offer default device choices to the teacher in subsequent tests or lessons. In an alternative embodiment, it may also be suggested by an appropriate message printed on the screen of the teacher computer 200, 201 or 240 that the student may experience more difficulty with certain sounds in later lessons so that preparation may be made in advance, such as pre-teaching, to assist the student in moving beyond this difficulty. Difficulty in several categories of sounds suggests that this student's preferred CHANNEL OF LEARNING is some channel other than the Auditory. At the conclusion of the Auditory test sequence, the performance data is stored in the memory of the system for later use and reporting.

Another CHANNEL OF LEARNING tested is the Visual 604 (FIG. 6a), shown in more detail in FIG. 7b. It is possible to incorporate limited visual testing into the Auditory channel 600. To the extent that it is determined that the student is more successful when presented certain symbols for sounds than with others, it is suggestive that this pattern may result from a visual deficiency. In the Visual test 720 in FIG. 7b, an object such as a common toy or animal, different shapes of the same color, a single shape of different colors, or mixed colors, shapes and sizes is shown to the student (step 722). Using a speech synthesizer, the student might be asked to click on objects of the same color, objects of the same shape regardless of color, etc (step 724). The student's clicks are then recorded (step 726) along with appropriate date, timing and system configuration information. These data are then analyzed (step 728) to determine the number of tries, the correctness of choices, etc. Accuracy is measured and compared (step 730) with pre-set criteria stored in memory. The results of the comparison are stored in the appropriate files in memory (step 732). Incorrect choices are analyzed to determine what common characteristics are evident. Such characteristics include whether a particular color is common in the incorrect tries, or a shape, or a size.

Additional testing is offered to define the deficiencies of students who have disabilities. Testing beyond the basics described above includes determining the student's abilities with respect to eye/hand coordination. In this instance, an outline of an object, such as a phonogram, is presented. The student is asked via the speech synthesizer to trace the letter(s) (e.g., with a light pen) while staying within the outlined shape and the student's response is recorded, determining in real-time whether the tracing contacts or crosses the outline and how often this happens. The student is also prompted to start the tracing at the appropriate starting point required to correctly form letters in a prescribed sequence that helps prevent acquired dyslexia. The time required to complete the task is recorded. The screen image is saved into memory for later analysis and reporting. Among the criteria used in the evaluation of progress is accuracy in staying within the outline, repeatability of the task as the outline spacing is reduced over time, smoothness of the tracings, etc. as listed under the heading "Evaluation Criteria" in FIGS. 12a-12c. Evaluation of the recorded response over time enables documentation of improvement in eye/hand coordination and whether it is influenced by outline size and space provided within the letter(s) on the SYSTEM COMPONENT used such as a mouse or a touch tablet.

Repeatability is tested over time by presenting the outlines which offer challenges for the student. Records over time support conclusions with respect to improvements. The stored data also serve as a database for statistical studies describing the activities.

If identifiable characteristics are observed, the system stores this information for reporting to the teacher. The program also uses this information to delete or modify program elements to address the observed deficient. These data are used by the program in prescribing SYSTEM COMPONENTS which provide the optimum learning environment for the Visual CHANNEL OF LEARNING.

In the event the response received by the system does not exceed the predetermined performance criteria (as listed in FIGS. 12a-12c) the EVALUATE module 400 is repeated until the student exceeds the level of performance represented by the predetermined performance criteria for that particular target objective as explained in more detail in the discussion of FIG. 7. When the predetermined performance criteria has been exceeded, a new instructional objective is selected from the hierarchically ranked CONSTRUCTS 300 (see FIG. 3) and the process repeated. In this repetitive manner, the student is able to master each successive CONSTRUCT until the predetermined performance criteria for the selected CONSTRUCT is exceeded.

Figure 10A:
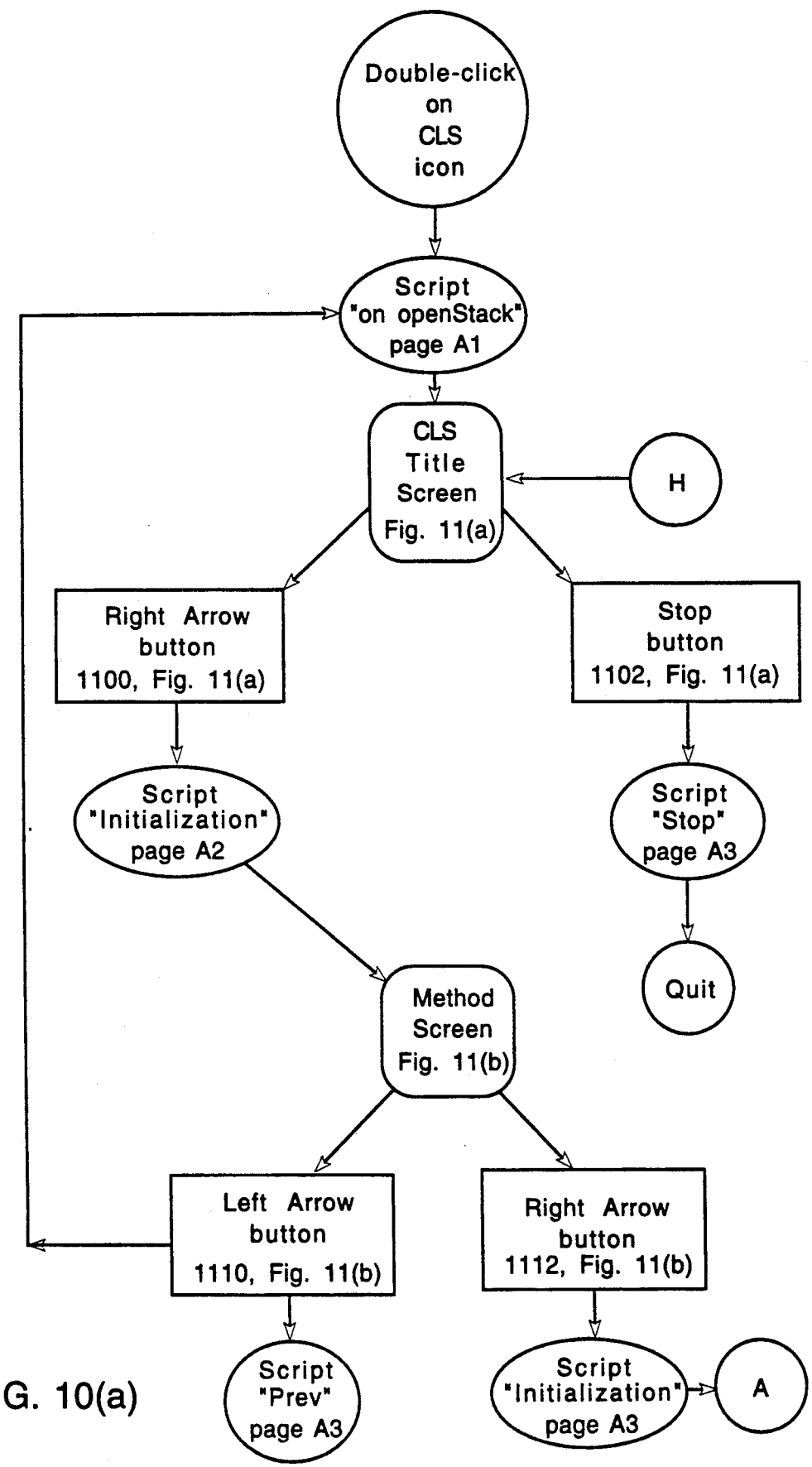
FIGS. 10a-10b provide an overview of the system software structure and organization. A pattern is provided in the figures for understanding the actions described. The system screens are in bold curved boxes, buttons are in square boxes, and scripts are in dashed ellipses. Scripts in the preferred embodiment are preprogrammed segments of code which are executed when specified by the passage of messages by HYPERCARD TM. Scripts are not accessible to the teacher or learner. If the learner places the cursor over a button, say the "Right Arrow" button in FIG. 11a, and clicks, then HYPERCARD TM sends a "mouse up" message through the program hierarchy. The button where the click occurs interprets the message as determined by the script of card button id 5 listed on page A3. To facilitate understanding the unstructured organization of this HYPERCARD TM version of the method of the present invention the name of the script and its location are provided within each of these boxes.
Figure 10B:
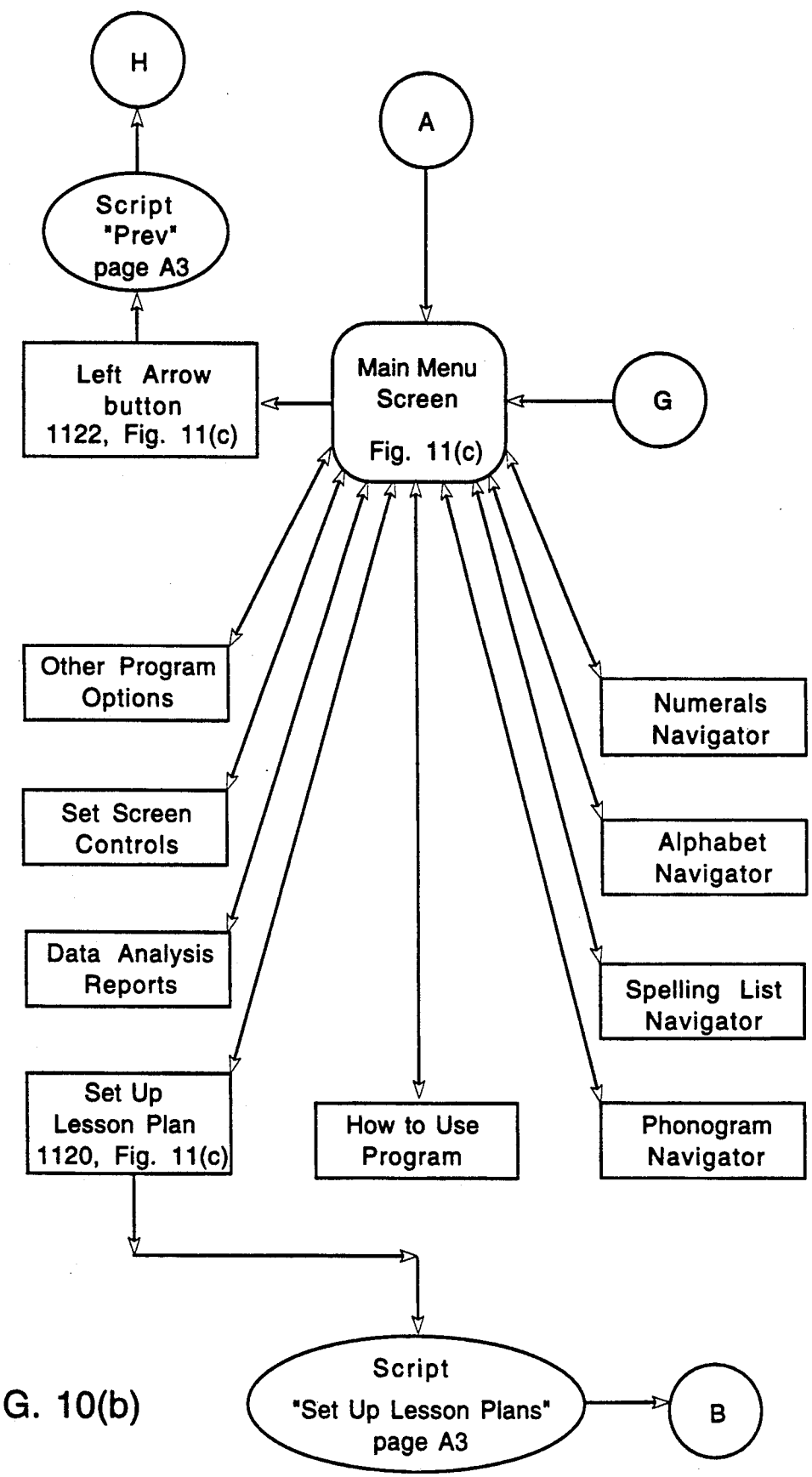
Figure 10C:
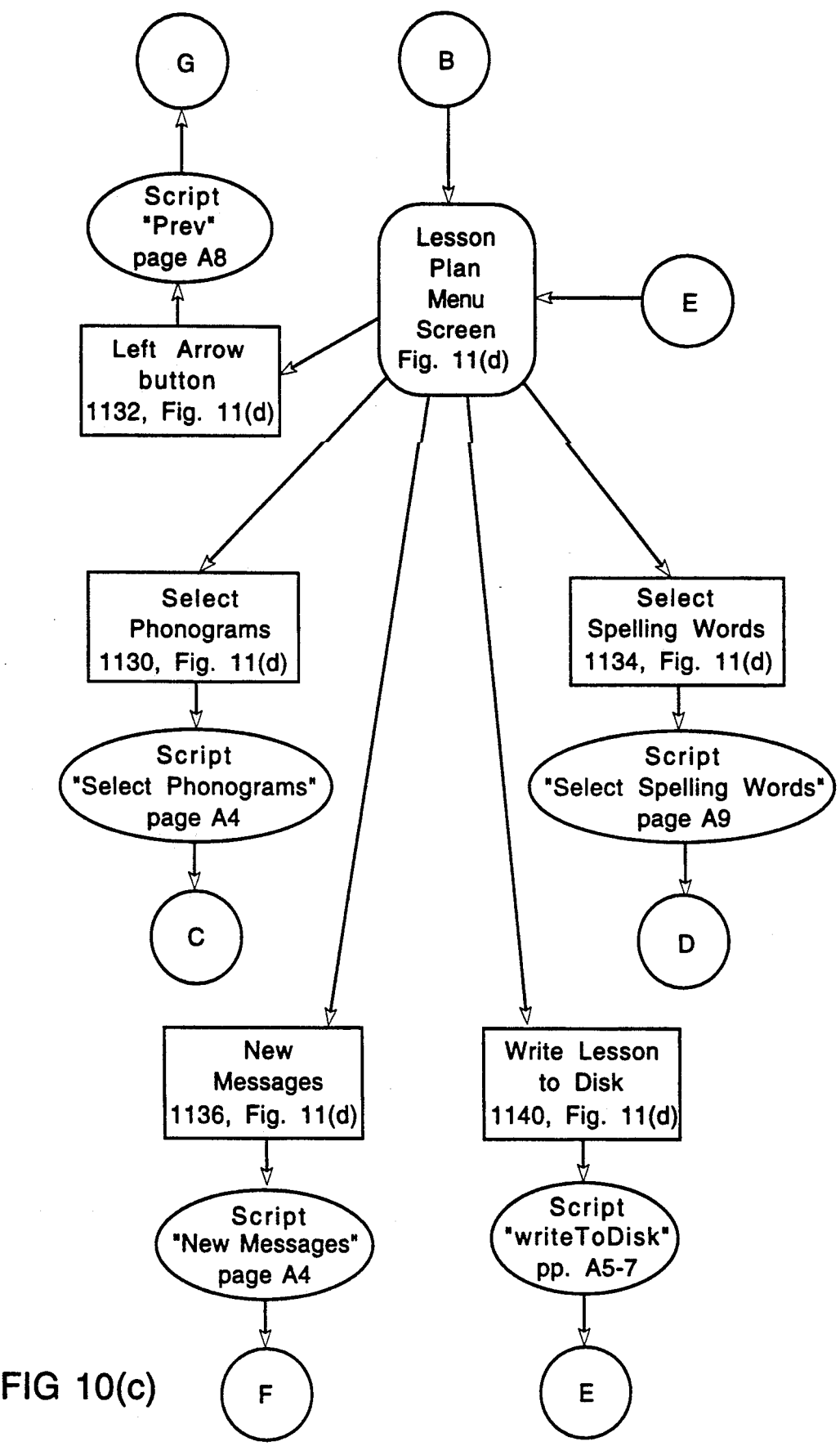
Figure 10D:
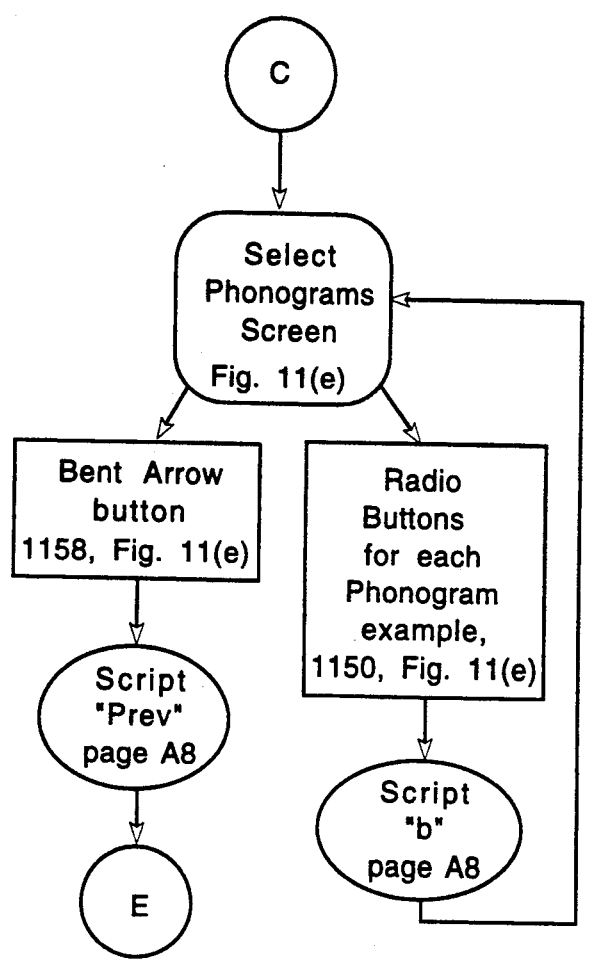
Figure 10E:
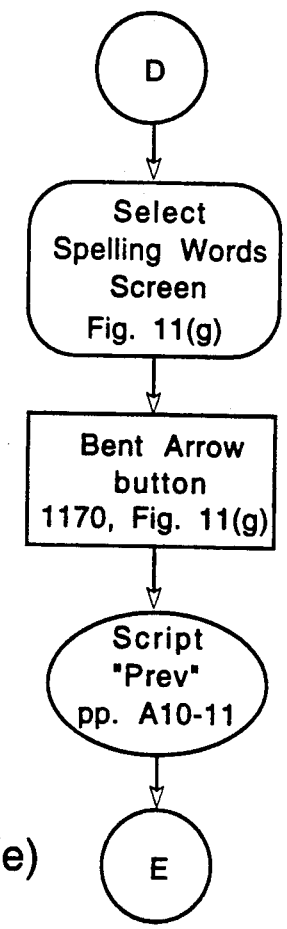
Figure 10F:
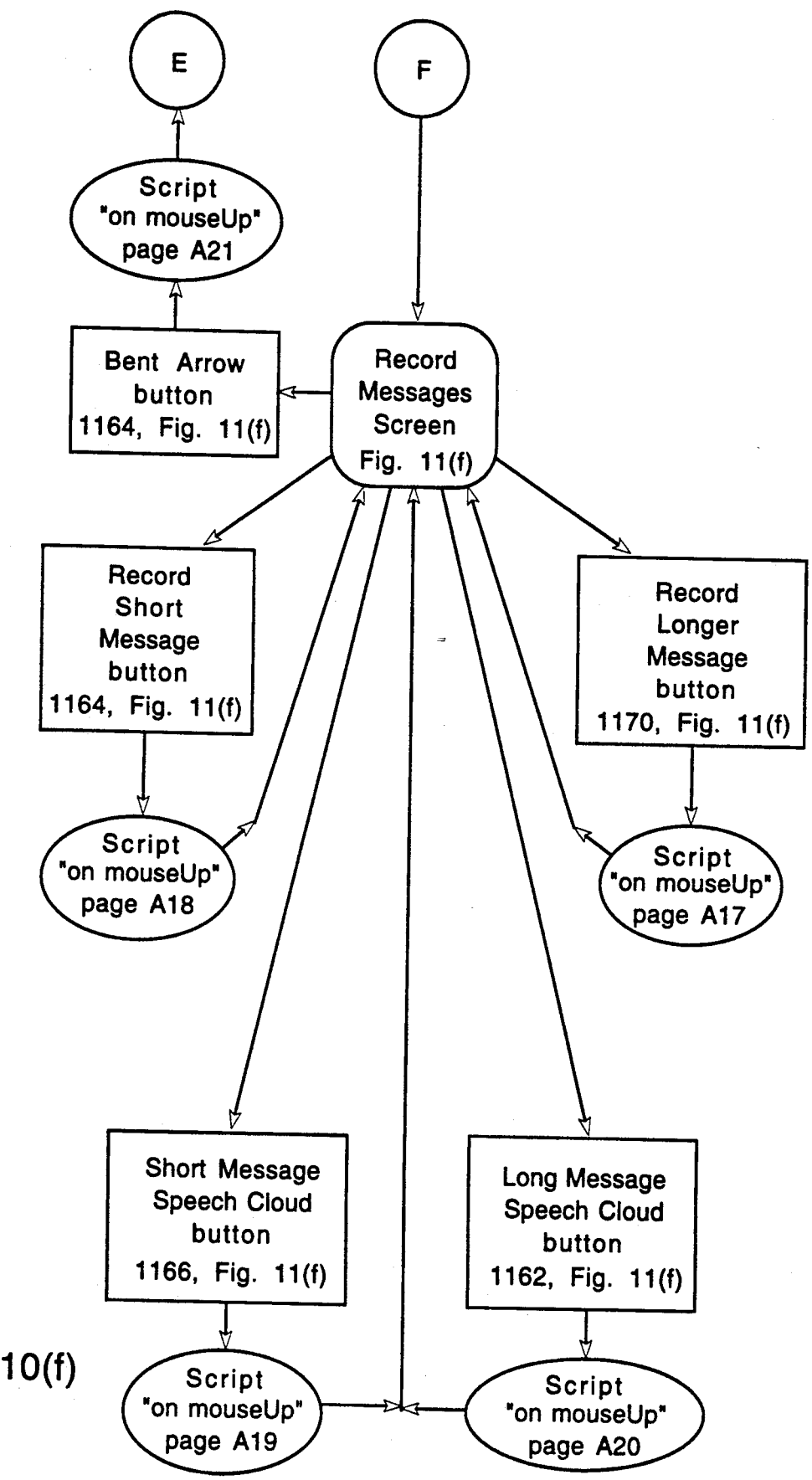

A schematic diagram of the system software structure and organization is set out in FIGS. 10a-10b. The "CLS" stack is the fundamental element of the system software used by the teacher. "CLS" contains preprogrammed and defined screens which enable the teacher to prepare a given lesson which will be stored for later use by a student. Examples of cards which make up the stack are displayed in FIGS. 11a-11g.

The way the program works can be illustrated by describing how a teacher uses the system software to prepare a phonograms lesson for a student. The path described is shown as the heavy lines in FIGS. 10a-10f. The teacher opens the stack by double-clicking (two rapid clicks) on its icon. This causes the stack script entitled "on open Stack" listed in Appendix A on page A1 to be executed. The command "pass open Stack" at the end of that screen in the stack shown in FIG. 11a. The teacher proceeds by clicking on the "Right Arrow" button 1100.

Clicking the "Right Arrow" button 1100 invokes the script entitled "Initialization" listed on page A2 in Appendix A. This brings up the next screen, FIG. 11b, which identifies the phonetic system currently forming the basis of the lessons. At this point, the teacher may return to the initial title screen, FIG. 11a, by clicking on the "Left Arrow" button 1110 There a click on the "Stop" button 1102 will terminate the program execution. The teacher may also proceed with lesson preparation by clicking the "Right Arrow" button 1112 which invokes the "on mouseUp" script entitled "Initialization" listed on page A3. This displays the "Main Menu" screen, FIG. 11c. Since the objective of the activity is to set up a student phonograms lesson plan, the teacher would click on the "Set Up Lesson Plans" button 1120 to display the screen having these options. Pressing this button invokes the script entitled "Set Up Lesson Plans" which is listed on page A3 and causes the screen of FIG. 11d to be displayed.

The activities associated with this screen are to select the phonograms, select the spelling words, record a message, specify the student's name, write the lesson data out to disk, then quit the session. Thus the teacher would click the "Select Phonograms" button 1130 to activate the "Select Phonograms" script listed on page A4. The screen presented is that of FIG. 11e, shown here after the "b", "c", "d"and "f" buttons have been clicked. Typical of the action invoked when each phonogram button is clicked is that given in the script entitled "b" listing on page A8 for phonogram "b". After selecting the desired phonograms for the lesson by clicking on their buttons 1150-1156, the by clicking on the "Bent Arrow" button 1158 invoking the script entitled "Prev" listed on page A8.

Figure 11A:
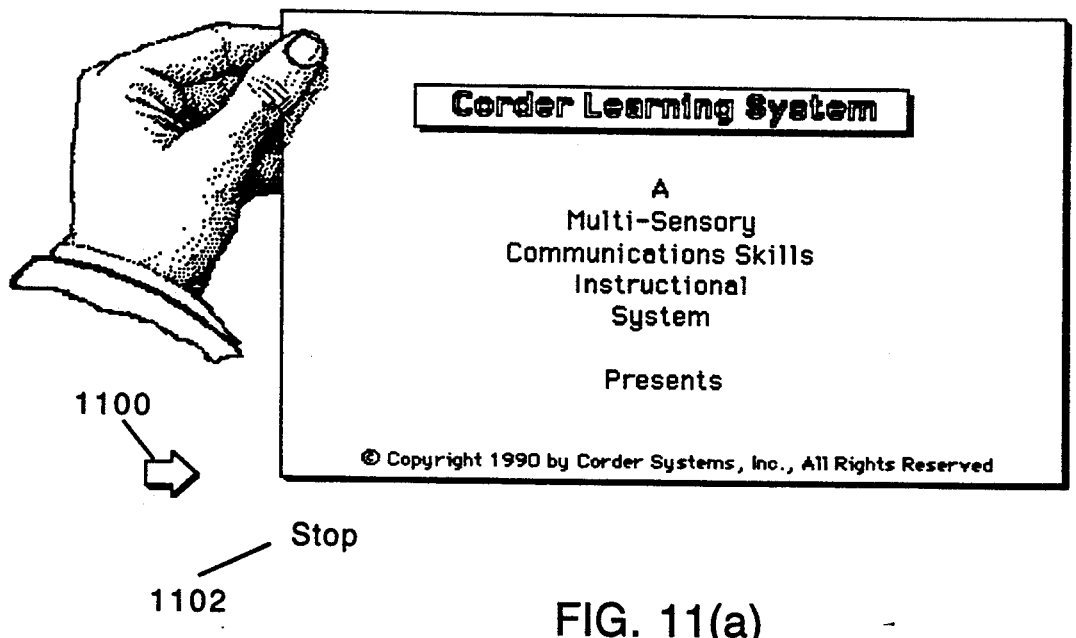
FIGS. 11a-11g display screens contained in the system software. These screens are discussed in the Examples.
Figure 11B:
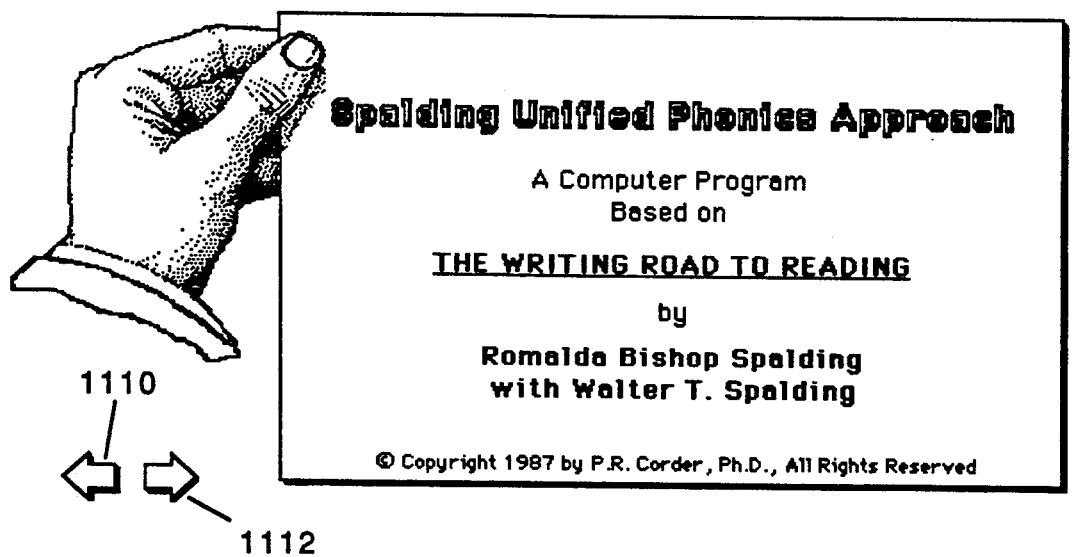
Figure 11C:
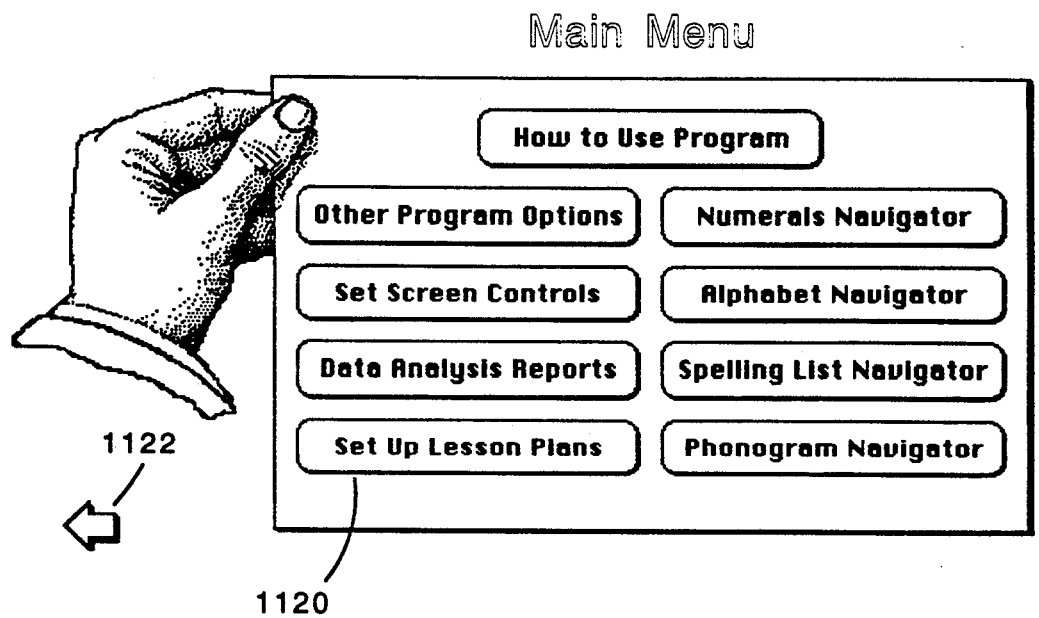
Figure 11D:
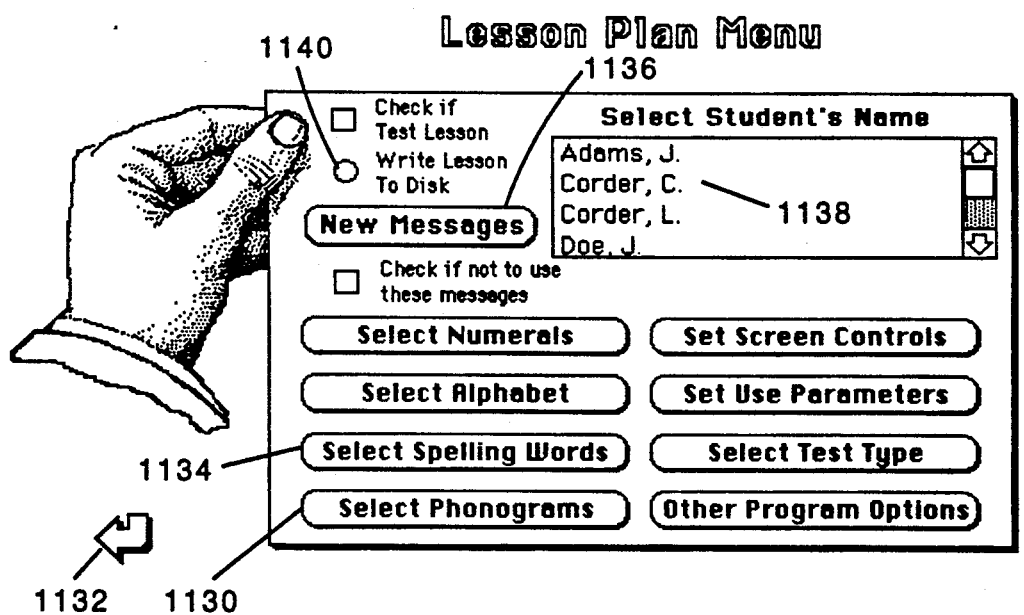
Figure 11E:
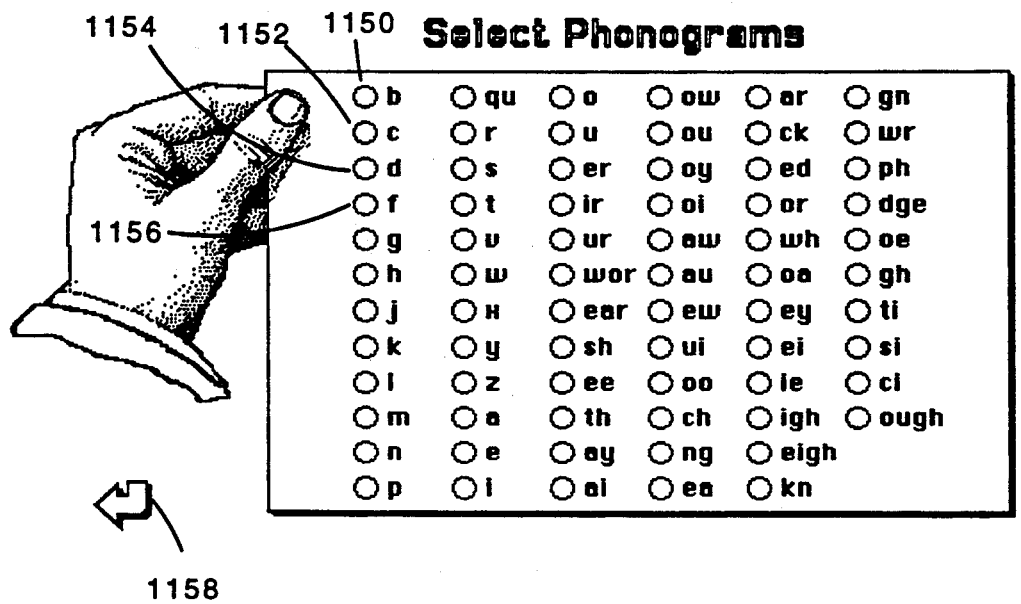
Figure 11F:
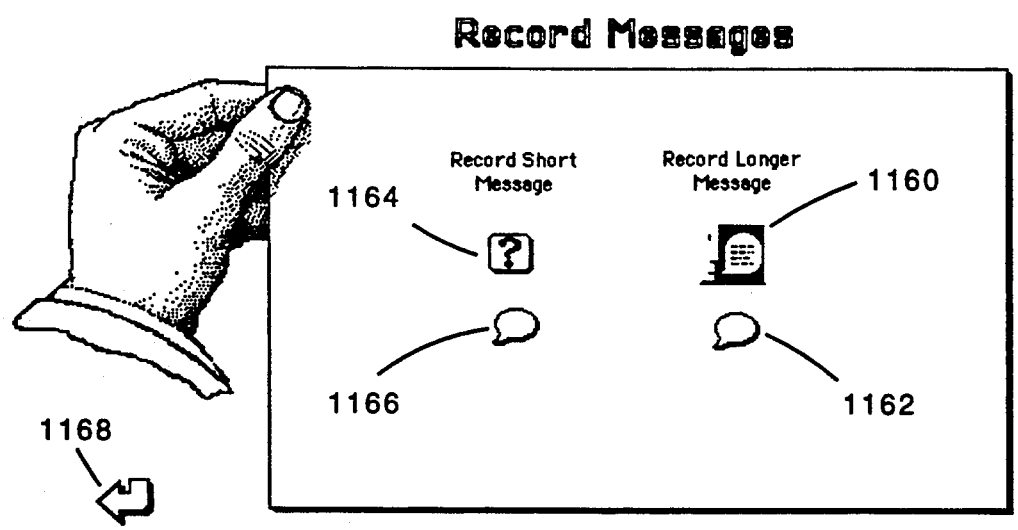
Figure 11G:
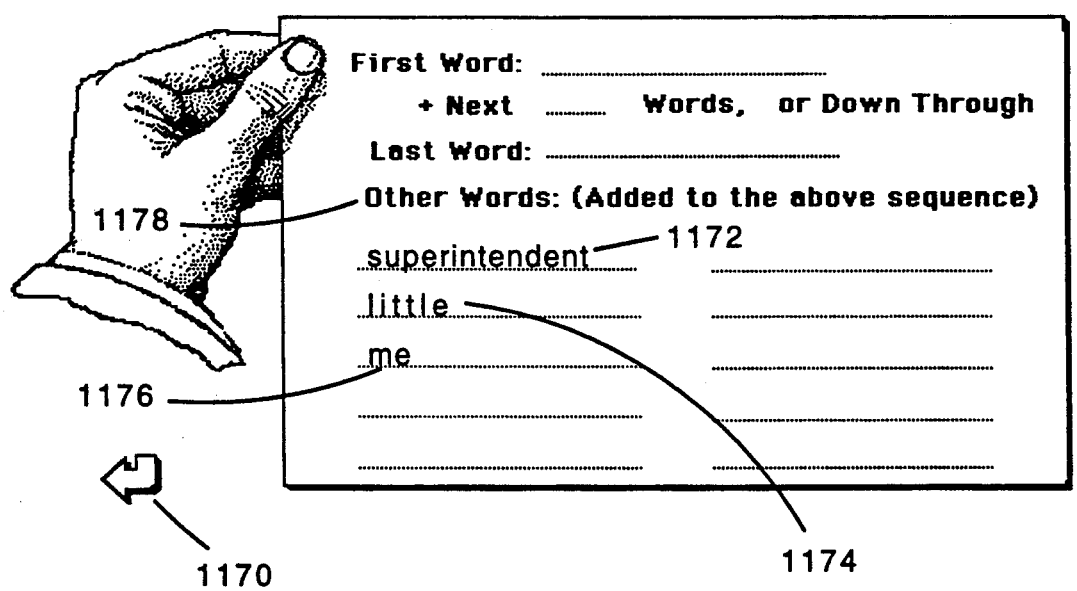

Spelling words are selected from the screen shown in FIG. 11g. This screen is invoked upon clicking the "Select Spelling Words" button 1134. The "Select Spelling Words" script listed on page A9 is executed. In this example the three words 1172, 1174, and 1176 for this lesson are entered into the lines under "Other Words:" 1178. The teacher returns to the "Lesson Plan Menu" screen, FIG. 11d, by clicking on the "Bent Arrow" button 1170 invoking the "Prev" script listed on pages A10-11.

To record a special audio message for the student, the teacher clicks the button 1136 to invoke the "New Messages" script listed on page A4. This action brings up the screen shown in FIG. 11f. By clicking on the "Face with Speech Cloud"]button 1160, the teacher initiates a recording opportunity. The "longMessage" script is that given on page A9. Upon saying the message into the system microphone, the teacher may hear the recording by clicking on the "Speech Cloud" button 1162 under the message button just used. The associated script entitled "hearLongMessage" is that listed on page A9. The teacher returns to the "Lesson Plan Menu" screen FIG. 11d, by clicking on the "Bent Arrow" button 1164 to invoke the "Prev" script listed on page A9. Having selected the lesson phonograms, spelling words and recorded the message, the teacher now selects the student's name. After positioning the cursor over the student's name 1138 in the scrollable window, the teacher double-clicks or drags the cursor over the length of the name while holding the mouse button down to select the name. The last step in preparation of a lesson is storing the material selected by clicking on the "Write Lesson to Disk" button 1140, thus invoking the script listed on pages A5 through A7. This script causes the lesson material to be saved onto a floppy disk for later use by the student. Other storage means are also possible.

Having completed the lesson preparation, the teacher quits the program by returning to the initial screen, FIG. 11a and by clicking on the "Bent Arrow" button 1132 to bring up the Main Menu screen, FIG. 11c. A click on the "Left Arrow" button 1122 causes the initial screen, FIG. 11a, to be shown. Program termination is made by clicking on the "Stop" button 1102. The "Stop" script invoked by clicking on this button is listed on page A3 of Appendix A.

The method of the present invention is better understood by reference to the following examples. These examples are set out herein for purposes of exemplification and are not intended, and should not be construed so as, to limit the scope of the invention.

EXAMPLE 1

In a first embodiment, the target instructional objective to be achieved is the recognition of the relationships between the sounds and the symbols of the English language. The constructs used to accomplish this target objective are letters or combinations of letters and their sound(s), and the learning channels selected are those of hearing, seeing, and speaking.

The computer components utilized are the central processing unit, display screen, keyboard, mouse, speaker/sound synthesizer, memory, sound digitizer, microphone, and the system software. For purposes of simplicity, the following discussion is limited to the phonograms "b", "c", "d", and "f".

A. How the Teacher Prepares the Lesson

The process followed by the teacher to prepare the lesson is depicted in the logic diagram of FIGS. 10a-10e. The teacher sees the screen starting the system. Moving the cursor with the mouse and clicking at the location of the "Right Arrow" button on the screen or pressing the right arrow key on the keyboard brings up the second screen. After a brief pause, the program then automatically goes to the next screen, the "Main Menu" screen. For inexperienced users of the program, information on how to use the program can be obtained by clicking a "How To Use Program" button. A scrollable window containing the information is presented. For experienced users, clicking on the "Set Up Lesson Plans" button brings up the "Lesson Plan" screen. The teacher moves the mouse over the "Select Phonograms" button and clicks to bring up the "Select Phonograms" screen. The teacher then clicks on the small round radio buttons beside the phonograms "b", "c", "d", and "f". Any phonogram may be selected or deselected by repeated clicking on its radio button. Having chosen the desired phonograms, the teacher moves the cursor to the "Bent Arrow" button and clicks to return to the "Lesson Plan" screen.

The student's name is selected from the student list in a scrollable window containing the information using either the scroll window elevator or the up and down arrow keys on the keyboard. The student's name, if missing, can be typed into the list using standard procedures controlled by the computer's operating system and then selected by dragging across it with the mouse button held down while the screen cursor is moved across the name. If the teacher believes that this student needs special encouragement during the lesson, a message can be recorded using the "New Messages" button. Clicking on the "New Messages" button causes the program to display the screen shown in FIG. 11f. A click on the "Question Mark" causes a radio button to replace the "Question Mark" button. Clicking on this radio button causes the digitizing equipment to begin a recording of the teacher saying the special short message. An example might be: "Johnny, remember to slow down and think." A vertical line on the left of the screen begins forming representing the time being used for the recording. When the recording time has elapsed, the time-line is completed and the radio button disappears. The "Question Mark" button then reappears. The just-completed recording may be heard by clicking the "Speech Cloud" button beneath the "Question Mark" button. It may be rerecorded if the teacher thinks that it does not sound right.

The teacher avails herself of another opportunity to convey information to the student using the "Face with Speech Cloud" button. This provides for a longer message which might relate to the different lip positions when saying "b" (lips in straight line) and "d" (tongue curved) in order that confusion common with these two phonograms is avoided and precision in speaking is encouraged. The teacher clicks on the "Face with Speech Cloud" button which causes this button to disappear and be replaced by a radio button at that location. A message in a dialogue box on the screen shows how many seconds are available for recording the special message. The teacher clicks on the radio button and immediately begins saying the special message into the system microphone.

A vertical line on the left of the screen begins forming representing the time being used for the recording. When the recording time has elapsed, the radio button disappears and the "Face with Speech Cloud" button reappears. The just-completed recording may be heard by clicking the "Speech Cloud" button below this button. The teacher then moves the mouse to the location of the "Write Lesson to Disk" button and clicks it to cause the program to write the appropriate individualized lesson information out to a disk. This disk is then given to the student. If the program is being run on a network, the lesson stack (a HYPERCARD ™ program) is written to a file folder having the student's name and the student is given access to this folder from his computer elsewhere in the network.

Additional student lesson disks are prepared by repeating the above process at the option of the teacher. New messages to the next student can also be recorded. On subsequent lesson disks the teacher might choose not to use the two special recorded messages. They will not be included, even if recorded, if the "Check if not to use these Messages" button is selected.

When lesson preparation is finished, the teacher clicks the "Bent Arrow" button to branch back to the "Main Menu" screen. Clicking the "Left Arrow" button brings up the initial screen. The teacher causes the program to quit by clicking on the "Stop" button or simultaneously pressing the "Command" and "Q" keys on the keyboard.

B. How the Student Learns the Lesson

Figure 8:
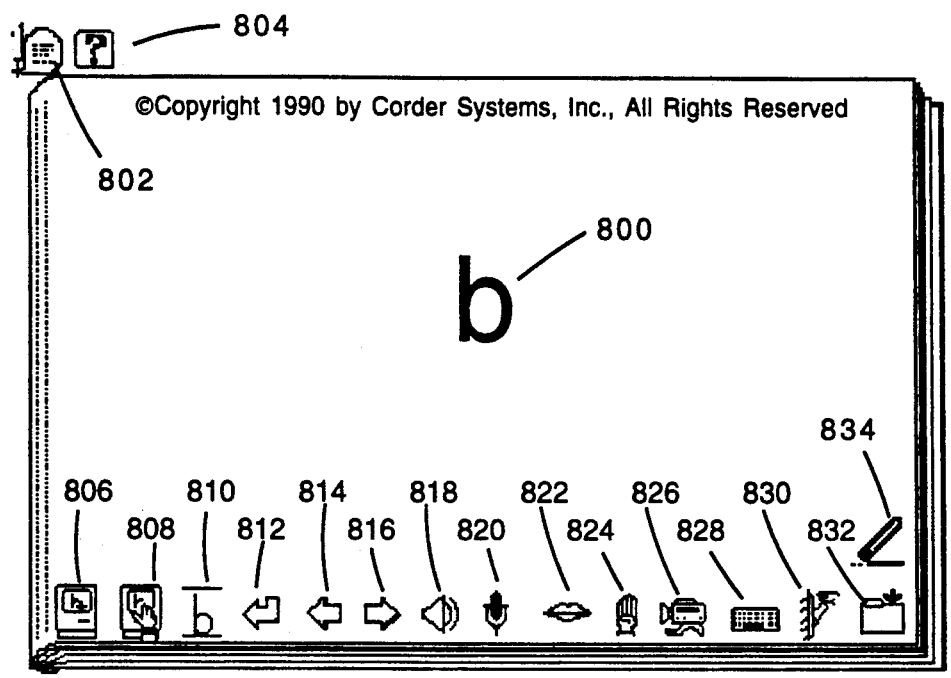
FIG. 8 is a reproduction of a functionality screen for display on a computer monitor of a type which is used to advantage in teaching phonograms in accordance with the method of the present invention. The first phonogram presented is the letter "b" 800. Each icon, or button, 802-834 causes an action which facilitates the learning process. For example, clicking the "Speaker" 818 button causes the digitized sound of the phonogram to be heard. The images provided on the buttons are representative of the action associated with that button and learning by discovery is encouraged.

The learner begins the lesson by inserting the disk prepared by the teacher into a computer and by double-clicking the program icon starts the program. The initial screen is presented upon start-up. The student clicks the "Right Arrow" button or presses the right arrow key on the keyboard to bring up the next screen. The program pauses briefly before bringing up the first phonogram screen shown in FIG. 8.

The learner presses, or clicks, the "Speaker" button causing the computer to say the sound of "b". Each time the "Speaker" button is pressed, the digitized sound is heard. When the learner presses the "Microphone" button, the icon of the "Start Recording" radio button is revealed on the screen. This gives the learner a clue to prepare mentally for the recording. Immediately upon pressing the "Start Recording" radio button, the learner speaks the sound of the current phonogram into the microphone provided in the system. The time used is indicated by a lengthening black vertical bar on the right of the screen. When the bar reaches its maximum, the recording action stops, the "Start Recording" radio button disappears and a "Speech Cloud" button, which can cause the computer to replay the just-finished recording of the student, appears. The student presses this "Speech Cloud" button to hear his own just-recorded voice. He presses the "Speaker" button to hear the voice of the standard selected from memory. This activity is repeated until the learner and his teacher are satisfied with the performance of the student. Voice analysis also provides a numerical value in the box next to the "Speech Cloud" button. This numerical value is one measure of how close the learner has replicated the standard recording and is used in the EVALUATE module of the software system. Other ways of visualizing the comparison are also available. When both the teacher and student are satisfied, the "File Folder" button is pressed to save this recording into the learner's file for later analysis by the teacher and the software system. The data is dated and time-stamped.

The learner then clicks on the "Right Arrow" button to go to the next phonogram in the lesson. These phonograms have the same functionality as described above for phonogram "b". After going through all phonograms in the lesson, they are presented to the student in random order for another pass through the list.

C. How Performance Data Is Utilized

The objective is to use the performance data collected to measure whether the student has learned the sound/symbol relationships associated with the first four phonograms, "b", "c", "d", and "f". By saving the iterations of learner performance indicating improvement in repeated recordings and making comparisons with the prerecorded standard, the student gains an improved self-image supporting the fact that he can learn. By evaluating several recordings over time, either manually or through electronic means, the teacher can assess progress over time. The program also suggests ways to achieve improvements in performance. Adjustments can be made in future lesson plans for this student.

EXAMPLE 2

In a second embodiment, the target objective to be achieved is the ability to correctly form the letters of the English language alphabet. The construct used is, of course, letters, and the learning channels are seeing, hearing and writing. Again, the discussion is limited to the letters "b", "c", "d", and "f".

A. How the Teacher Prepares the Lesson

The teacher sees the screen upon starting the system, moves the cursor with the mouse, and by clicking at the location of the "Right Arrow" button, brings up the second screen. After a brief pause, the program automatically goes to the next screen, the "Main Menu" screen. For inexperienced users of the program, information on how to use the program can be obtained by clicking on the "How To Use Program" button. A scrollable window containing the information is presented, and for experienced users, clicking on the "Set Up Lesson Plans" button brings up the "Lesson Plan" screen. The teacher moves the mouse over the "Select Phonograms" button and clicks to bring up the "Select Phonograms" screen. The teacher then clicks on the radio buttons beside the phonograms "b", "c", "c", and "f". Any phonogram may be selected or deselected by repeated clicking on its radio button.

Having chosen the desired phonograms, the teacher moves the cursor to the "Bent Arrow" button and clicks to return to the "Lesson Plan" screen. The student's name is selected from the student list in a scrollable window containing the information using either the scroll window elevator or the up and down arrow keys on the keyboard. The student's name, if missing, can be typed into the list using standard procedures controlled by the computer's operating system and then selected by dragging across it with the mouse button held down while the screen cursor is moved across the name. If the teacher believes that this student needs special encouragement during the lesson, a message can be recorded using the "New Messages" button. Clicking on the "New Messages" button causes the program to display the screen shown in FIG. 11f. A click on the "Question Mark" causes a radio button to replace the "Question Mark" button. Clicking on this radio button causes the digitizing equipment to begin a recording of the teacher saying the special short message. An example might be: "Johnny, remember to slow down and think." A vertical line on the left of the screen begins forming representing the time being used for the recording. When the recording time has elapsed, the time-line is completed and the radio button disappears. The "Question Mark" button then reappears. The just-completed recording may be heard by clicking the "Speech Cloud" button beneath the "Question Mark" button. It may be rerecorded if the teacher thinks that it does not sound right.

The teacher avails herself of another opportunity to convey information to the student using the "Face with Speech Cloud" button. This provides for a longer message which might relate to the different lip positions when saying "b" (lips in straight line) and "d" (tongue curved) to avoid the confusion common between these two phonograms and encourage precision in speaking. The teacher clicks on the "Face with Speech Cloud" button which causes this button to be replaced by a radio button. A message in a dialogue box on the screen shows how many seconds are available for recording the special message. The teacher clicks on the radio button and immediately begins saying the special message into the system microphone. A vertical line on the left of the screen begins forming representing the time being used for the recording. When the recording time has elapsed, the radio button disappears and the "Face with Speech Cloud" button reappears. The just-completed recording may be heard by clicking the "Speech Cloud" button below this button.

The teacher then moves the mouse to the "Write Lesson to Disk" button and clicks to write the appropriate individualized lesson information out to a disk. This disk is then given to the student. If the program is being run on a network, the lesson stack (a HYPER-CARD ™ program) is written to a file folder having the student's name and the student is given access to this folder from his computer elsewhere in the network.

Additional student lesson disks are prepared by repeating the above process at the option of the teacher. New messages to the next student can also be recorded. On subsequent lesson disks the teacher might choose not to use the two special recorded messages. They will not be included, even if recorded, if the "Check if not to use these Messages" button is selected.

When lesson preparation is finished, the teacher clicks on the "Bent Arrow" to cause the program to branch back to the "Main Menu" screen. Clicking the "Left Arrow" button brings up the initial screen. The teacher causes the program to quit by clicking on the "Stop" button or by simultaneously pressing the "Command" and "Q" keys.

B. How the Student Learns the Lesson

The student begins the lesson by inserting the disk prepared by the teacher into a computer and starting the program. The initial screen is presented and the student clicks the "Right Arrow" button to bring up the next screen.

The program pauses briefly before bringing up the first phonogram screen (FIG. 8), after which, if horizontal ruled lines are not present, the learner causes them to be drawn by clicking on the "b-with-lines" button. The presence of these horizontal lines reinforces the spatial relationships required in good penmanship. After this option is selected, the computer says the sound(s) of the symbol on the screen. The learner presses, or clicks, the "Computer-with-cross-cursor" button to see the symbol correctly formed, or written, in real-time on the screen. This selection causes the program to clear the phonogram from the screen, to say the sound(s) of the phonogram, and then to draw the symbol correctly.

For the phonogram "b", the line begins at the top of the straight portion of the letter just beneath the upper horizontal line, if present. The line lengthens in real time until it touches the bottom horizontal ruled line, if present, or reaches its correct length. Then without moving off the just drawn line, the cross-cursor moves up to where the curved portion begins and this portion of the letter is progressively drawn until the letter is complete. After completion of the forming of the symbol, the sound(s) is heard again. This action should be repeated by the student using pencil and paper in order to reinforce and maximize the benefit of the kinesthetic action of the brain directing the hand to write the symbol using the same sequence of strokes used by the computer.

If directed by the teacher, the system, through its speech synthesizer, encourages the student to use the available system resource, such as a touch screen, to trace the phonogram on the screen. These symbols may, or may not, be in outline form at the teacher's option. The program "beeps" if the student does not start the tracing at the appropriate starting point taught in the methodology of the invention. Once started, the student is given audible clues, such as beeps, if he strays beyond a given distance from the letter or does not follow the prescribed motion required to form the letter(s). Following a sequence which incorporates the correct directions in which writing is performed is useful in preventing acquired dyslexia. One measure of success in this task is the absence of system beeps. Another is statistical smoothness in the tracing. Copies of the screen are among the data saved for later assessment by the program and the teacher.

If the teacher had selected the option during lesson preparation, small numbers would have appeared inside the curved part of the letter as the drawing passed the "10", "2", "4" and "8" positions as on an analog clock. These numbers provide a connection to the analog clock face as a way of reinforcing correct sequencing of the lines drawn while the letter was being formed. Performance data are captured by the system and stored in memory for future use.

The learner then clicks on the "Right Arrow" button to go to the next phonogram in the lesson. Each screen has the same appearance, with the exception that the phonogram symbol changes to "c", "d", or "f". The sounds are also consistent. The same functionality is available to the learner as described above for phonogram "b"

After going through all phonograms in the lesson, they are put in random order before presenting them to the student for the second, or subsequent pass, through the list. This presentation prevents the student from learning a particular sequence for the phonograms.

The learner moves the mouse to the "Bent Arrow" button and clicks to return to the initial screen. A click on the "Stop" button terminates the lesson session.

C. How Performance Data is Utilized

Performance data collected and saved during this and earlier lessons are used to determine improvement in the student's ability to correctly form the letters which make up the phonograms in such a way that good penmanship is encouraged and the tendency to acquire dyslexia is discouraged. These data are used indirectly by the student through encouraged repetition of letter formation patterns which reinforce good penmanship. The teacher uses the screen images to visually assess improvement over time. The program also keeps track of the statistical gains in smoothness, accuracy in following the prescribed formation patterns, etc. As improvements are documented, the system adjusts the performance criteria used to determine success, such as the allowed distance the student is permitted to stray away from the letter being traced. The performance criteria become more demanding as progress is made.

EXAMPLE 3

In a third embodiment, the target objective to be achieved is the syllabification of the words of the English language. The constructs used are letters, phonograms, syllables, and words, and the channels of learning utilized are seeing, hearing, speaking, and writing and/or movement. In the case of this example, the words under consideration are "superintendent", "little" and "do", but those skilled in the art who have the benefit of this disclosure will recognize that any other word, in any other language, may be treated in similar fashion.

A. How the Teacher Prepares the Lesson

The teacher sees the "Opening" screen upon starting the system. Moving the cursor with the mouse and clicking at the location of the "Right Arrow" button brings up the second screen. After pausing briefly, the program automatically goes to the next screen, the "Main Menu" screen. For inexperienced users of the program, information on how to use the program can be obtained by clicking on the "How To Use Program" button. A scrollable window containing the information is presented, and for experienced users, clicking on the "Set Up Lessons Plans" button brings up the "Lesson Plan" screen.

The teacher moves the cursor with the mouse and clicks on the "Select Spelling Words" button to bring up the "Select Spelling Words" screen. The teacher then types in the words "superintendent", "little", and "do" into the "Other Words" blanks provided by the system software. Part of the "Select Spelling Words" screen generated by the program is available for more efficient entry of those words which are sequential in the list of spelling words programmed by specifying the beginning and end words in the list. When the desired words have been entered, the teacher returns to the "Lesson Plan" screen by clicking the "Bent Arrow" button.

The student's name is selected from the student list in a scrollable window containing the information using either the scroll window elevator or the up and down arrow keys on the keyboard. The student's name, if missing, can be typed into the list using standard procedures controlled by the computer's operating system and then selected by dragging across it with the mouse button held down while the screen cursor is moved across the name. If the teacher believes that this student needs special encouragement during the lesson, a message can be recorded using the "New Messages" button. Clicking on the "New Messages" button causes the program to display the screen shown in FIG. 11f. A click on the "Question Mark" causes a radio button to replace the "Question Mark" button. Clicking on this radio button causes the digitizing equipment to begin a recording of the teacher saying the special short message. An example might be: "Johnny, remember to slow down and think." A vertical line on the left of the screen begins forming representing the time being used for the recording. When the recording time has elapsed, the time-line is completed and the radio button disappears. The "Question Mark" button then reappears. The just-completed recording may be heard by clicking the "Speech Cloud" button beneath the "Question Mark" button. It may be rerecorded if the teacher thinks that it does not sound right.

The teacher avails herself of another opportunity to convey information to the student using the "Face with Speech Cloud" button. This provides for a longer message which might relate to the different lip positions when saying "b" (lips in straight line) and "d" (tongue curved) in order that confusion common with these two phonograms is avoided and precision in speaking is encouraged.

The teacher clicks on the "Face with Speech Cloud" button which causes this button to disappear and be replaced by a radio button at that location. A message in a dialogue box on the screen shows how many seconds are available for recording the special message. The teacher clicks on the radio button and immediately begins saying the special message into the system microphone.

A vertical line on the left of the screen begins forming representing the time being used for the recording. When the recording time has elapsed, the radio button disappears and the "Face with Speech Cloud" button reappears. The just-completed recording may be heard by clicking the "Speech Cloud" button below this button.

The teacher then moves the mouse to the "Write Lesson to Disk" button and clicks to write the appropriate individualized lesson information out to a disk. This disk is then given to the student. If the program is being run on a network, the lesson stack (a HYPERCARD TM program) is written to a file folder having the student's name and the student is given access to this folder from his computer elsewhere in the network.

Additional student lesson disks are prepared by repeating the above process at the option of the teacher. New messages to the next student can also be recorded. On subsequent lesson disks the teacher might choose to not use the two special recorded messages. They will not be included, even if recorded, if the "Check if not to use these Messages" button is selected.

Additional student lesson disks may be prepared during this session at the option of the teacher. On subsequent lesson disks, the teacher might choose to not use the two special recorded messages. They will not be included if the "Check if not to use these Messages" button is selected. When lesson preparation is finished, clicking on the "Bent Arrow" button branches back to the "Main Menu" screen. Clicking the "Left Arrow" button will go back one screen where clicking on the newly-presented "Left Arrow" button will bring up the "Opening" screen. Clicking on the "Stop" button causes the program to quit. An alternative way to quit program execution is to simultaneously press the "Command" and "Q" keys on the keyboard.

B. How the Student Does the Lesson

Figure 9:
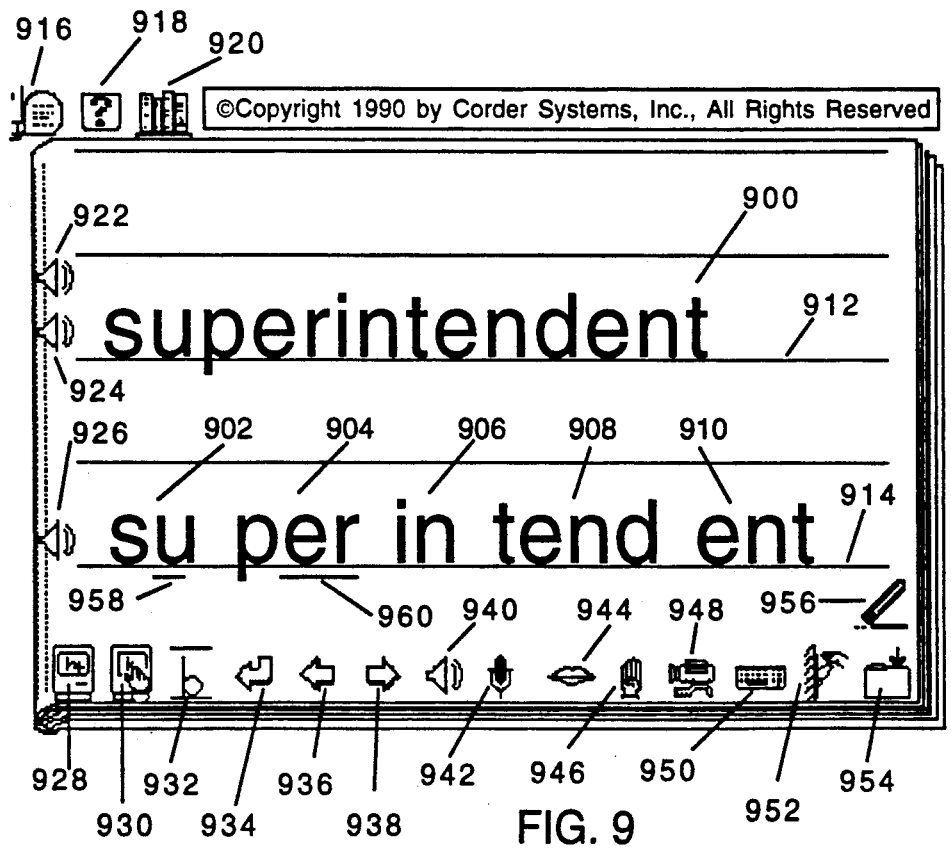
FIG. 9 is a reproduction of a functionality screen for display on a computer monitor of a type which is used to advantage in teaching the syllabification of a word in accordance with the method of the present invention. The example shown is for the spelling word "Superintendent" 900. Each button 916-956 causes an action which facilitates the learning process. For example, clicking the "Speaker" 940 button causes the digitized sound of the word to be heard. Clicking on the "Books-on-Shelf" button 920 causes a digitized recording of the word best used in a common sentence. The images on the buttons are representative of the action associated with that button. By holding down certain keys on the keyboard while clicking on some buttons certain advanced learning concepts are presented. For example, holding the "Command" key down while clicking the "Books-on-Shelf" button 920 causes the spelling rule that controls the word shown on the screen to be heard. Holding the "Option" key down while clicking the "Books-on-Shelf" button 920 causes an alternative sentence using the word to be heard. This sentence conveys, for instance, a different context in which the word is used. Alternative, and less physically demanding, means for accomplishing these described tasks are available for handicapped learners. The use of other buttons are described in the Examples.

The learner begins the lesson by inserting the disk prepared by the teacher into a computer and starting the program. When the initial screen is presented, the student clicks the "Right Arrow" button to bring up the next screen and a "Spelling Word" screen is displayed. In this example, the word "superintendent" is presented as shown in FIG. 9. The word is shown on the second line in its normal printed form. The word is broken and separated into syllables on the bottom line of the screen. Some of the phonograms in the word are marked to identify them as a group or to identify which sound is used when a phonogram has multiple sounds.

The learner presses the "Speaker" button on the bottom of the screen (see FIG. 9) to cause the computer to say the sound of "superintendent" as heard in normal speech (previously recorded into system memory). Each time the "Speaker" button is pressed, the word is enunciated as it would be in normal, conversational speech. To hear the word as pronounced for spelling, the student clicks the lower "Speaker" button to the left of the word on the second line in FIG. 9. The upper "Speaker" button to the left of the top word causes each phonogram to be sounded in sequence. To hear the sound of a particular syllable of that word, the student clicks on that syllable on the bottom line, for example, the second syllable.

To hear the individual sounds of the phonograms comprising each syllable, the student clicks on the phonograms in the word on the second line making up the syllable being studied. The two-letter phonogram "er" is underlined in FIG. 9 to indicate that the letters are spoken as a single phonetic unit. "E" and "r" are recognized as forming a phonogram, so clicking anywhere on these two letters in the upper word causes the sound of that phonogram to be heard. Moving the mouse down to the syllable "ent" on the bottom line and clicking produces the "blended" sound of that syllable. Moving the cursor up to the left of the top word and clicking on the lower "Speaker" button enables the student to listen for the syllable within the spoken word. Clicking the "Speaker" button on the line with the word separated into syllables causes each syllable to be said with a pause between them. The same thing can be accomplished by clicking on each syllable in sequence.

When the learner presses the "Microphone" button at the bottom of the screen, a series of "Start Recording" radio buttons appears, giving the learner a cue to prepare mentally for the recording and a choice as to which button he will use. Pressing the radio button beneath a particular syllable enables the learner to record his saying of that syllable. For example, the "per" syllable might be the focus. Immediately upon pressing the "Start Recording" radio button under a syllable, the learner speaks the sound of the syllable into the system sound digitizing equipment. The time used is indicated by a lengthening black vertical bar on the right of the screen. When the bar reaches its maximum, the recording action stops, the "Start Recording" radio button disappears and a "Speech Cloud" button appears. (The other "Speech Cloud" buttons are associated with the other syllables of the word, each appearing beneath its syllable when it has been recorded, and is not visible until that syllable is recorded.) Pressing the "Speech Cloud" button replays the just-finished recording of the learner saying "per". The student presses this "Speech Cloud" button to hear his voice, then clicks the syllable itself to hear the voice of the standard saying of the syllable. This activity is repeated until the learner and his teacher are satisfied with the performance of the student. The numerical values in the box beside each "Speech Cloud" provide an alternative measure of how well the learner has replicated the standard's enunciation of that item and various numerical studies are performed on the voice recording.

These numerical studies include electronic analysis to provide information about the statistics of the waveform of the student's recorded voice. The energy contained in the student's waveform is measured by its mean square value. Information concerning the properties of the waveform in the amplitude domain is acquired by probability density functions. Calculating the autocorrelation function provides information concerning the properties of a waveform variable, such as amplitude, in the time domain. On the other hand, the power spectral density function provides similar information in the frequency domain. Such statistical analysis is performed by subroutines containing the appropriate analog/digital signal processors. These analyses have already been performed on the system's standard voice recordings. Comparison between the student's statistics and those of the standard is made as one measure of the accuracy in the student's replication of the standard's waveform. In another embodiment, this measure is accomplished by the teacher comparing the waveform as it is plotted on the screen, for instance, as an overlay over the standard's plotted waveform. The analyses performed by the analog/digital signal processors on the student recording are reduced to a single value and normalized with respect to the same values for the standard used. A value of "1.00" is perfect, while "0.00" represents no measurable comparison. When both are satisfied, the "File Folder" button is pressed to save this recording into the learner's file for later analyses by the teacher or speech therapist.

The learner clicks on the "Right Arrow" button to go to the next word in the lesson, "little", in which the same functionality is available to the learner as described above for the word "superintendent". As set out in syllables on the second line of the screen (not shown), double underlining is preferably provided as a marking indicating that a phonogram in this word is a "silent final 'e'" and a marking provided in the second syllable of the word to indicate the reason for this particular "silent 'e'". Double clicking on that marking causes a recorded message to be heard giving the reason why this "silent final 'e'" is needed. When clicking on the 'e' in the word "little" on the second line, in which the syllables of the word are presented as described above for the word "superintendent", no sound is heard because in this word the final 'e' is silent. Rules which govern the proper use of sounds are available to the learner in different way, for instance, by double-clicking on the particular marking, or by double-clicking on a syllable or word.

The learner clicks the "Right Arrow" button to go to the next word in the lesson, "do", and another marking is preferably provided above the phonogram "o" on the second line of the screen (not shown) to indicate which sound of this multisound phonogram is used in this word. If the sound used had been the first, or most commonly used, sound, then no such marking is shown.

After going through all the words in the lesson, they are put in random order before presenting them to the student for the second, or subsequent pass, through the list. This random ordering prevents the student from learning a particular sequence for the words. Once mastered, the learner moves the mouse to the "Bent Arrow" button and clicks to return to the initial screen. A click on the "stop" button terminates the session.

C. How the Performance Data is Utilized

The objective is to save and use the automatically program-generated performance data of the student learning the syllabification of words of the language, such as the words "superintendent", "little", and "do". Performance data collected and saved during this and earlier spelling lessons are used to determine improvement in the student's ability to learn the syllabification of words, such as, "superintendent", "little", and "me". One way the teacher uses the data is to assess improvement in performance over time. Improvement is measured in accuracy in identifying syllables, repeatability and retentivity.

Gains in accuracy in the student's articulation of the syllables, reduced time to complete a lesson, etc. are also monitored. As improvements are documented, the margins incorporated in the decision rules used to determine success, such as the expected accuracy in replicating speaking the syllables, are adjusted so that the decision rules become more exacting as progress is made. By tracking the improvements over time, presentation of the materials is adjusted. The teacher can override these decision rule margins as appropriate.

In a presently preferred embodiment, the SYSTEM COMPONENTS are controlled by a program run on a central processing unit, and a representative portion of the listing of that program is appended hereto. It is not intended, however, to limit the scope of the present invention to the appended embodiment. Instead, it is intended that changes in the specific implementation of the invention which do not depart from the manner in which the components thereof function to achieve the desired results be included within the scope of the following claims.

Appendix A

Script of stack HardDisk:CLS:CLS

```
on openStack
    global R, Rboa, deltheta, dellin, delsp, delsp2, delx, dely
    global XRES,YRES, xstart,ystart, yline,ascent,descent,numtop, dragRate
    global WL, WT, WR, WB, WXC, WYC
    global fromWhere, writeLines, penSize
    global fromStack, fromCard, Kont
    global numInLesson -- number of phonograms selected for lesson
    global theLesson -- phonograms selected for lesson
    global thePhonograms -- sequential list of all the phonograms
    global memUsed -- memory space used on diskette for Student lesson
    global lessonControls, lessonData
    global theirLevel, currentLevel if the version < 1.2 then
      answer "This stack needs HyperCard 1.2." with "naturally"
      go Home
    end if
```

```
-- put the userLevel into theirLevel -- save to restore later
-- set userlevel to 3  -- prevent tampering with the stack?

-- Initialize  System Parameters
put 512 into XRES       -- horizontal resolution of Mac Plus/SE screen
put 342 into YRES       -- vertical resolution of Mac Plus/SE screen
set lineSize to 2
set dragSpeed to 0
put 24 into WL          -- left edge of viewing window
put 30 into WT          -- top edge of viewing window
put 480 into WR         -- right edge of viewing window
put 290 into WB         -- bottom edge of viewing window
put (WL+WR)/2 into WXC  -- horizontal center of viewing window
put (WT+WB)/2 into WYC  -- vertical center of viewing window -- Initialize Program Parameters
put 30 into R                   -- radius (in pixels) of a curved letter
put 1.3333 into Rboa            -- ratio of b/a for drawing ellipses
put 2 into deltheta             -- delta theta, degrees
put trunc(4.5*R) into dellin    -- spacing (pixels) between top/bot lines
put trunc(0.5*R) into delsp     -- horizontal spacing (pixels) of letters
put trunc(0.25*R) into delsp2   -- delsp / 2
put trunc(0.8666*R) into delx   -- = (0.866 * R)
put trunc(0.5*R) into dely      -- = (0.5 * R)
put WXC into xstart             -- horizontal start point - middle of card screen
put WYC + trunc(1.5*R) into ystart -- vert cursor starting point in card screen
put ystart+1 into yline         -- vertical location of bottom line
put 4*R into ascent             -- distance a tall letter rises above the line
put 3*R into numtop             -- distance a number goes above the line
put 2*R into descent            -- distance a letter goes below the line
put 150 into dragRate           -- rate at which a line is drawn put 2 into penSize              -- width of drawing pen = 1,2,3,4
put "No" into writeLines        -- logical varible re background lines put "b c d f g h j k l m n p qu r s t v w x y z" into thePhonograms
put  " a e i o u er ir ur wor ear sh ee th ay ai" after thePhonograms
put . " ow ou oy oi aw au ew ul oo ch ng ea ar ck" after thePhonograms
put  " ed or wh oa ey ei ie igh eigh kn gn wr ph" after thePhonograms
put  " dge oe gh ti si ci ough" after thePhonograms hide message box
hide menuBar
pass openStack
end openStack on closeStack
   global theirLevel,currentLevel
   -- set userLevel to theirLevel -- set back to the way it was -- could use this section to save parameters for the next time
end closeStack on mouseUp   -- HyperLink Mag., Mar/Apr, 1989, p. 44
   if the cmdKey is down  -- lock and unlock fields using cmdKey & click
   then if long name of the target contains "field"
   then set lockText of the target to not lockText of the target
end mouseUp function CallBack recTime
   -- recTime is provided by the Record XFCN
   put (recTime/60) into recSecs
   put "You have" && recSecs &&¬
   "seconds to record.  Click the mouse to begin." into card field "len"
   wait until the mouseclick
   return 1
   -- Return a 1 to continue,  0 to abort
end CallBack
```

Script of card button id 5 = "Initialization"

```
on mouseUp
  global userLevel set userLevel to 5    -- scripting put "0" into Kont       -- loop counter for student lesson disk
  put "CLS" into fromStack
  put 189 into memUsed   -- memory space needed for Lesson stack on disk
  set LockScreen to TRUE
  go to card Main_Control
  set the rect of card button ID 6 to 232,85,398,115 -- How To Use
  set the rect of card button ID 1 to 145,245,310,275 -- Lesson Plans
  set the rect of card button ID 2 to 145,165,310,195 -- Graphics Cntl
  set the rect of card button ID 5 to 145,205,310,235 -- Analysis Mod
  set the rect of card button ID 18 to 145,125,310,155 -- Other Options
  set the rect of card button ID 8 to 320,245,485,275 -- Phonogram Nav
  set the rect of card button ID 17 to 320,205,485,235 -- Spelling Nav
  set the rect of card button ID 15 to 320,165,485,195 -- Alphabet Nav
  set the rect of card button ID 16 to 320,125,485,155 -- Numerals Nav
  go to card Initial
  set lockScreen to FALSE
  visual effect wipe left
  go to card "Opening"
  wait 1 seconds
  click at loc of card button "Initialization"
end mouseUp
```

Script of card button id 18 = "Stop"

```
on mouseUp
  doMenu "Quit HyperCard"
end mouseUp
```

Script of card button id 5 = "Initialization"

```
on mouseUp
  visual effect wipe left
  go to next card
end mouseUp
```

Script of card button id 3 = "Home"

```
on mouseUp
  visual effect wipe right
  go card Initial
end mouseUp
```

Script of card button id 11 = "Prev"

```
on mouseUp
  visual effect wipe right
  go to first card
end mouseUp
```

Script of card button id 1 = "Set Up Lesson Plans"

```
on mouseUp
  set LockScreen to TRUE
  go to card lessonPlans
  set the rect of card button ID 2 to 150,275,310,295 -- Select Phonog
  set the rect of card button ID 26 to 150,245,310,265 -- Select Spelling
  set the rect of card button ID 25 to 150,215,310,235 -- Select Alphabet
  set the rect of card button ID 24 to 150,185,310,205 -- Select Numerals
  set the rect of card button ID 17 to 320,245,480,265 -- Reset
```

```
set the rect of card button ID 22 to 320,215,480,235 -- Use Params
set the rect of card button ID 13 to 320,185,480,205 -- Graphic Contls
set the rect of card button ID 15 to 320,275,480,295 -- Other Options set the rect of card button "New Messages" to 148,134,260,157
set the rect of card button "testLesson" to 159,73,243,98
set the rect of card button "writeToDisk" to 159,103,243,130
set the rect of card button "notUseMessages" to 151,161,259,180 set the rect of card field ID 19 to 266,82,491,180 -- student names
set the rect of card field ID 34 to 177,104,243,129 -- Write to disk
set the rect of card field ID 33 to 178,73,239,98 -- Test Option
set the rect of card field ID 46 to 170,158,262,185 -- not use messages go to card Main_Control
set lockScreen to FALSE
visual effect iris open
go to card lessonPlans
select line 1 of card field "studentName"
end mouseUp
```

Script of card button id 2 = "Select Phonograms"

```
on mouseUp
  global seqNum, memUsed
  global theLesson, typeLesson
  global flagPhonograms  -- flag set when phonograms are set put "phonograms" into typeLesson
  put 189 into memUsed  -- reinitialize memory available parameter
  put "0" into seqNum
  repeat with i = 1 to 69
    put " 0" after seqNum
  end repeat
  put " " into theLesson
  set lockScreen to TRUE
  go to card selectPhonograms
  repeat with i = 1 to 70  -- the card button numbers
    if hilite of card button i is FALSE then
    else
      set hilite of card button i to FALSE
    end if
  end repeat
  set lockScreen to FALSE
  visual effect iris open
end mouseUp
```

Script of card button id 31 = "New Messages"

```
on mouseUp
  go to card "recordMessages"
end mouseUp
```

Script of card button id 14 = "writeToDisk"

```
on mouseUp
  global thePhonograms,theLesson,numInLesson,Kont,typeLesson
  global thisLesson,thisMany
  global fromStack,toStack
  global lessonControls, lessonData, studentName
  global flagPhonograms  -- flag set when phonograms are set set lockScreen to true
  put the Selection into studentName
  put studentName
  set cursor to busy -- begin write out of lesson here
  if hilite of card button "testLesson" is FALSE then  -- ID 27, set up lesson
    -- repeat for all selected items
```

```
--      open a selected stack
--      make a copy of this stack
--      save in "Phonograms" or "Words" folder on disk
--      set controls in stack "Lesson"
-- end repeat
choose Browse tool
if numInLesson >= 1 then       -- Phonograms or Words have been selected
  put 1 into cycleThru         -- Cycle counter re type message
  repeat with ii = 1 to numInLesson -- for each phonogram in lesson
    set cursor to busy  -- creates spinning beach ball effect
    put word ii of theLesson into theTarget
    go to stack theTarget
    beep 1
    --
    -- Improvement - capture student name and append to
    -- message window to remind teacher where she is in list.
    --
    -- ************************************************************
    if cycleThru =1 then
       put " SELECT Student's Disk, OPEN Phonograms or Words folder, SAVE."
       put cycleThru + 1 into cycleThru   -- use different message below
    else
       put " If still in Phonograms or Words folder, SAVE."
       put cycleThru + 1 into cycleThru
    end if
    doMenu "Save a Copy..."
    -- Strip off "Copy of "
    put "Copy of " & theTarget into thisStack
    go to stack thisStack             -- "copy of 'phonogram' or 'word'"
    delete first word of thisStack    -- strip off "Copy"
    delete first word of thisStack    -- strip off "of"
    if name of this stack <> "CLS" then ¬.
    set name of this stack to thisStack
    put "         Looking for next phonogram or word "
  end repeat
  -- ************************************************************
  -- set use controls in stack "Lesson"
  -- copy stack "Lesson" and save onto disk
  -- (This will be the student's access to the lesson phonograms or words)
  -- Copy teacher's recorded messages over to lesson disk
  set lockScreen to TRUE
  go to stack "HardDisk:CLS:CLS"
  go to card lessonPlans
  if hilite of cd button "notUseMessages" is TRUE then  -- ID 47
    -- Don't copy sounds, in fact, erase those already in Lesson stacks
    go to stack "Lesson"
    eraseSnd "longMessage"
    eraseSnd "shortMessage"
              Script of card button id 14 = "writeToDisk"

else  -- Copy current messages
    go to stack "HardDisk:CLS:CLS"
    put "                   Making a copy of the special messages.   "
    put the long name of this stack into thisStack
    delete word one of thisStack
    delete first character of thisStack
    delete last character of thisStack
    DuplicateSnd thisStack,"HardDisk:CLS:Lesson","shortMessage"
    DuplicateSnd thisStack,"HardDisk:CLS:Lesson","longMessage"
  end if
  --
  set lockScreen to TRUE
  go to card "Controls" of stack "Lesson"
  put studentName into card field "studentName"
  put typeLesson into card field "typeLesson"
  put 0 into card field "timesThru"
  put theLesson into card field "thisLesson"
  put numInLesson into card field "thisMany"
```

```
      put 0 into card field "Konter"
      put item 1 of line 1 of lessonControls into card field "numHear"
      put item 2 of line 1 of lessonControls into card field "numWritten"
      put item 3 of line 1 of lessonControls into card field "numLines"
      put item 4 of line 1 of lessonControls into card field "numWrite"
      choose Browse tool
      beep 3
   -- ************************************************************
      put "Go back to Desktop on Student's Disk,  SAVE."
      doMenu "Save a Copy..."
      -- Strip off "Copy of "
      go to stack "Copy of Lesson"
      -- May ask "Where is Copy of ...", Simply hit Return or Enter
      if name of this stack <> "CLS" then set name of this stack to "Lesson"
   -- ************************************************************
      beep 3
      put "     * * * * *     Returning for more lesson plans.     * * * * * "
      set lockScreen to TRUE
    else
      -- Don't write to disk because no phonograms or words were selected.
    end if
  else      -- begin set up of test lesson <<<<<<<<<<<<<<<<<<<<<<<<************
    set lockScreen to true
    -- copy sounds selected into Test stack on hard disk
    repeat with i=1 to numInLesson
      set cursor to busy  -- creates spinning beach ball effect
      put word i of theLesson into theSound
      put "    * * * *    Copying sounds for phonogram " into scrMsg
      put scrMsg && theSound    & "    * * * * "
      wait 1 second
      put "HardDisk:CLS:Phonograms:" & theSound into thisOne
      go to stack thisOne
      DuplicateSnd thisOne,"HardDisk:CLS:Test",theSound
    end repeat
    --
    -- Copy teacher's recorded messages over to test disk
    go to card lessonPlans of stack "HardDisk:CLS:CLS"
    if hilite of cd button id 47 is TRUE then
      -- Don't copy sounds, in fact, erase those already in Test stack
      go to stack "HardDisk:CLS:Test"
      eraseSnd "longMessage"
      eraseSnd "shortMessage"
    else
      -- Copy current messages
      go to stack "HardDisk:CLS:CLS"

Script of card button id 14 = "writeToDisk"

put "                    Making a copy of the special messages.    "
      put the long name of this stack into thisStack
      delete word one of thisStack
      delete first character of thisStack
      delete last character of thisStack
      DuplicateSnd thisStack,"HardDisk:CLS:Test","shortMessage"
      DuplicateSnd thisStack,"HardDisk:CLS:Test","longMessage"
    end if
    go to card "Controls" of stack "Test"
    put studentName into card field "studentName"
    -- put 0 into card field          -- number of correct responses
    put theLesson into card field "thisLesson"
    put numInLesson into card field "thisMany"
    put 0 into card field "Konter"
    choose Browse tool
    go to first card of stack "Test"
    beep 3
  -- ************************************************************
    -- Note, the Phonograms folder is not required to be present.
    put "                   SELECT Student's Disk,  SAVE."
    doMenu "Save a Copy..."
```

```
   -- Strip off "Copy of "
   go to stack "Copy of Test"              -- "copy of 'Test'"
   -- May ask "Where is Copy of ...", Simply hit Return or Enter
   if name of this stack <> "CLS" then set name of this stack to "Test"
   -- ***********************************************************
     put "    * * * * *    Returning for more test plans.    * * * * * "
   end if
   --
   -- Erase old recordings
   go to stack "HardDisk:CLS:Lesson"
   eraseSnd "longMessage"
   eraseSnd "shortMessage"
   go to stack "HardDisk:CLS:Test"
   eraseSnd "longMessage"
   eraseSnd "shortMessage"
   repeat with i=1 to numInLesson
     set cursor to busy  -- creates spinning beach ball effect
     put word i of theLesson into theSound
     eraseSnd theSound
   end repeat
   --
   go to card lessonPlans of stack CLS
   set hilite of card button ID 14 to FALSE -- Write to Folder
   set hilite of card button id 27 to FALSE -- Check if Test
   set hilite of card button id 47 to FALSE -- Check if not to use messages
   set lockScreen to FALSE
   -- repeat for each lesson plan
   hide message box
end mouseUp
```

Script of card button id 23 = "Prev"

```
on mouseUp
   visual effect iris close
   set hilite of cd btn "testLesson" to false        -- id 27
   set hilite of cd btn "writeToDisk" to false    -- id 14
   go to card Main_Control
end mouseUp
```

Script of card button id 2 = "b"

```
on mouseUp
   global seqNum, memUsed add 1 to word 1 of seqNum
   if word 1 of seqNum = 1 then
     put memUsed + 43 into memUsed
   else
     put 0 into word 1 of seqNum
     put memUsed - 43 into memUsed
   end if
   go to card Select_Phonograms
end mouseUp
```

Script of card button id 76 = "Prev"

```
on mouseUp
   global thePhonograms,seqNum,numInLesson,theLesson,Kont
   global toStack,fromStack
   global memUsed if memUsed > 530 then        -- capacity of an 800K diskette
     -- Lesson uses 200 K + 25 for the empty Phonograms fldr
     answer "Reduce the number of selections." with "OK"
   else
     put 0 into numInLesson
     put " " into theLesson
     repeat with i = 1 to 70
```

```
      if word i of seqNum = 0 then
      else
        put numInLesson + 1 into numInLesson
        if numInLesson = 1 then
          put word i of thePhonograms into theLesson
        else
          put " " & word i of thePhonograms after theLesson
        end if
      end if
    end repeat
    visual effect iris close
    go to card lessonPlans
  end if
end mouseUp
```

Script of card button id 5 = "longMessage"

```
on mouseUp

-- Each second allowed requires 22,250 bytes of disk space.
  -- On August 4, 1990, a 5 seconds limit was chosen to conserve space
  -- in 1 Meg machines.

hide card button "longMessage"
  hide card button "hearLongMessage"
  show card button "recordLongMessage"
  show card field "len"
  -- hide message box
  put Record("defMessage",1,1,300,true,"CallBack",¬
  the rectangle of card fld "Gauge") into cd fld "len"
  hide card field "len"
  hide card button "recordLongMessage"
  show card button "longMessage"
  show card button "hearLongMessage"

end mouseUp
```

Script of card button id 6 = "hearLongMessage"

```
on mouseUp
  Fplay "longMessage"
end mouseUp
```

Script of card button id 13 = "Prev"

```
on mouseUp
  hide card button "recordShortMessage"
  show card button "shortMessage"
  -- hide card button "hearMessage"
  hide card button "recordLongMessage"
  show card button "longMessage"
  visual effect iris close
  go to card "lessonPlans"
end mouseUp
```

Script of card button id 26 = "Select Spelling Words"

```
on mouseUp
  -- global seqNum, memUsed
  global theLesson, typeLesson put "spelling" into typeLesson go to card selectSpellingWords -- put 189 into memUsed   -- reinitialize memory available parameter
  -- put "0" into seqNum
  -- repeat with i = 1 to 69
  -- put " 0" after seqNum
```

```
-- end repeat
-- put " " into theLesson
-- go to card Select_Phonograms
-- repeat with i = 2 to 71   --  the card button numbers
-- if hilite of card button i is FALSE then
-- else
-- set hilite of card button i to FALSE
-- end if
-- end repeat
-- visual effect iris open
end mouseUp
```

Script of card button id 3 = "Prev"

```
on mouseUp                    -- Coded Mar.11,1991
   global toStack,fromStack
   global numInLesson,theLesson
   global memUsed -- Need to add code to check for requiring too much memory on disk put 0 into numInLesson
   put "" into theLesson -- the following options are not available in the initial release -- get word 1 of card field "firstWord"
   -- if it is "" then
   -- else
   -- put it & " " into word 1 of theLesson   -- add this word to lesson
   -- put numInLesson + 1 into numInLesson    -- one more word
   -- end if
   -- get word 1 of card field "Next"
   -- if it is "" then
   -- else
   -- put it & " " into word 2 of theLesson   -- add this word to lesson
   -- put numInLesson + 1 into numInLesson    -- one more word
   -- end if
   -- get word 1 of card field "lastWord"
   -- if it is "" then
   -- else
   -- put it & " " into word 3 of theLesson   -- add this word to lesson
   -- put numInLesson + 1 into numInLesson    -- one more word
   -- end if -- initial options available
   get word 1 of card field "otherWords1"
   if it is "" then
   else
      put it & " " into word 4 of theLesson   -- add this word to lesson
      put numInLesson + 1 into numInLesson    -- one more word
   end if
   get word 1 of card field "otherWords2"
   if it is "" then
   else
      put it & " " into word 5 of theLesson   -- add this word to lesson
      put numInLesson + 1 into numInLesson    -- one more word
   end if
   get word 1 of card field "otherWords3"
   if it is "" then
   else
      put it & " " into word 6 of theLesson   -- add this word to lesson
      put numInLesson + 1 into numInLesson    -- one more word
   end if
   get word 1 of card field "otherWords4"
   if it is "" then
   else
      put it & " " into word 7 of theLesson   -- add this word to lesson
      put numInLesson + 1 into numInLesson    -- one more word
```

```
end if
get word 1 of card field "otherWords5"
if it is "" then
else
   put it & " " into word 8 of theLesson   -- add this word to lesson
   put numInLesson + 1 into numInLesson    -- one more word
end if
get word 1 of card field "otherWords6"
```

Script of card button id 3 = "Prev"

```
if it is "" then
else
   put it & " " into word 9 of theLesson   -- add this word to lesson
   put numInLesson + 1 into numInLesson    -- one more word
end if
get word 1 of card field "otherWords7"
if it is "" then
else
   put it & " " into word 10 of theLesson  -- add this word to lesson
   put numInLesson + 1 into numInLesson    -- one more word
end if
get word 1 of card field "otherWords8"
if it is "" then
else
   put it & " " into word 11 of theLesson  -- add this word to lesson
   put numInLesson + 1 into numInLesson    -- one more word
end if
get word 1 of card field "otherWords9"
if it is "" then
else
   put it & " " into word 12 of theLesson  -- add this word to lesson
   put numInLesson + 1 into numInLesson    -- one more word
end if
get word 1 of card field "otherWords10"
if it is "" then
else
   put it into word 13 of theLesson   -- add this word to lesson
   put numInLesson + 1 into numInLesson    -- one more word
end if
-- put numInLesson & " " before theLesson   -- addend number of entries
-- put theLesson                            -- the lesson to be written to disk
-- number items in lesson, check for numerical value for range spec.
choose browse tool
visual effect iris close
go to card lessonPlans
end mouseUp
```

Script of stack HardDisk:PRC:CLS:Phonograms:b

```
on openStack
   hide menuBar
   hide message box
   show card field "copyRight"
   wait 1 seconds
   hide card field "copyRight"
end openStack function CallBack recTime
   -- recTime is provided by the Record XFCN
   put (recTime/60) into recSecs
   put "You have" && recSecs &&¬
   "seconds to record.  Click the mouse to begin." into card field "len"
   wait until the mouseclick
   return 1
   -- Return a 1 to continue,  0 to abort
end CallBack
```

Script of card button id 101 = "longMessage"

```
on mouseUp
```

```
  global fromStack
  global fromCard set lockscreen to true
  set cursor to busy
  push card
  set cursor to busy
  if fromStack is "CLS" then
    Fplay "longMessage"
  else
    go to stack "Student:Lesson"
    set cursor to busy
    go to card "Controls"
    set cursor to busy
    click at location of card button "longMessage"
  end if
  pop card
  set cursor to busy
  set lockscreen to false
end mouseUp
```

Script of card button id 102 = "shortMessage"

```
on mouseUp
  global fromStack
  global fromCard set lockscreen to true
  set cursor to busy
  push card
  set cursor to busy
  if fromStack is "CLS" then
    Fplay "shortMessage"
  else
    go to stack "Student:Lesson"
    set cursor to busy
    go to card "Controls"
    set cursor to busy
    click at location of card button "shortMessage"
  end if
  pop card
  set cursor to busy
  set lockscreen to false
end mouseUp
```

Script of card button id 79 = "Write"

```
on mouseUp
  global R, Rboa, deltheta, dellin, delsp, delsp2, delx, dely
  global XRES, YRES, xstart, ystart, yline, ascent, descent, dragRate
  global WL, WT, WR, WB, WXC, WYC
  global writeLines, penSize
  global lessonControls, lessonData -- set the userLevel to 3
  set cursor to 4
  add 1 to item 2 of line 1 of lessonData set lineSize to 2
  set dragSpeed to 0
  choose select tool
  drag from WL,WT to WR,WB
  doMenu Clear Picture
  if writeLines is "Yes" then
    choose pencil tool
    set dragSpeed to 0
    drag from xstart-150,yline-dellin to xstart+150,yline-dellin
    drag from (xstart-150),(yline) to (xstart+150),(yline)
  end if
```

```
-- hide clock face numerals
put 0 into cfi
repeat until cfi = 12
  put cfi+1 into cfi
  hide card field cfi
end repeat wait 20 ticks
Fplay "b"
wait 1 seconds
-- b
choose curve tool
set dragSpeed to dragRate
drag from (xstart-delx),(ystart-ascent) ¬
to (xstart-delx),(ystart)
drag from (xstart-delx),(ystart) ¬
to (xstart-delx),(ystart-trunc(1.5*R))
show card field b10
set dragSpeed to 0
put 150 into theta
show card field b10
repeat until theta = (-150)
  drag from (xstart+trunc(R*cos(theta*pi/180))),¬
  (ystart-R-trunc(R*sin(theta*pi/180))) ¬
  to (xstart+trunc(R*cos((theta-deltheta)*pi/180))),¬
  (ystart-R-trunc(R*sin((theta-deltheta)*pi/180)))
  put theta - deltheta into theta
  -- if theta <=150-3*deltheta then hide card field b10
  if theta =30 then show card field b2
  -- if theta <=30-3*deltheta then hide card field b2
  if theta =-30 then show card field b4
  -- if theta =-30-3*deltheta then hide card field b4
  if theta <=-140 then show card field b8
  -- if theta <=-150 then hide card field b8
end repeat
choose browse tool
Fplay "b"
wait 4 seconds
hide card field b10
hide card field b2
hide card field b4
hide card field b8
-- set the userLevel to 1
end mouseUp
```

Script of card button id 80 = "Touch"

```
on mouseUp
  global R, Rboa, deltheta, dellin, delsp, delsp2, delx, dely
  global XRES, YRES, xstart, ystart, yline, ascent, descent, dragRate
  global WL, WT, WR, WB, WXC, WYC
  global writeLines, penSize
  global lessonControls, lessonData -- set the userLevel to 3
  -- set cursor to 4
  -- add 1 to item 2 of line 1 of lessonData
  -- freeze screen refresh
  set lockScreen to TRUE
  -- blank screen area 0,0 to XRES,YRES
  set lineSize to 2
  set dragSpeed to 0
  choose select tool
  drag from 0,0 to XRES,YRES
  doMenu Clear Picture
  if writeLines is "Yes" then
    choose pencil tool
    set dragSpeed to 0
    drag from xstart-150,yline-dellin to xstart+150,yline-dellin
```

```
      drag from (xstart-150),(yline) to (xstart+150),(yline)
   end if
   -- copy phonogram from tempCard back onto Card
   go to next card
   choose select tool
   drag from WL,WT to WR,WB
   doMenu Copy Picture
   go to previous card
   doMenu Paste Picture
   choose browse tool
   -- allow screen refresh
   set lockScreen to FALSE
   -- script to allow writing action until writingStop button pressed
   choose curve tool
end mouseUp
```

Script of card button id 81 = "Lines"

```
on mouseUp
   global R, Rboa, deltheta, dellin, delsp, delsp2, delx, dely
   global XRES, YRES, xstart, ystart, yline, ascent, descent, dragRate
   global WL, WT, WR, WB, WXC, WYC
   global fromWhere    -- direction of call
   global writeLines   -- logical varible re background lines
   global penSize      -- width of drawing pen
   global lessonControls, lessonData -- set the userLevel to 3
   set cursor to 4
   add 1 to item 3 of line 1 of lessonData
   -- if writeLines is "No" then   -- not needed, remove IF for production
   choose pencil tool
   set dragSpeed to 0
   drag from xstart-150,yline-dellin to xstart+150,yline-dellin
   drag from (xstart-150),(yline) to (xstart+150),(yline)
   choose browse tool
   Fplay "b"
   -- end if
   -- set the userLevel to 1
end mouseUp
```

Script of card button id 98 = "Return"

```
on mouseUp
   global fromStack,fromCard hide card button "studentVoice"
   hide card button "recordVoice"
   hide cd button "Eye"
   hide cd button "recordVideo"
   hide cd button "Student Video"
   set cursor to 4
   visual effect dissolve
   if fromStack is "CLS" then
      set lockScreen to TRUE
      go to stack CLS
      go to card mainNavigator
      repeat with buttonNum = 1 to 70
         set hilite of card button buttonNum to false
      end repeat
   else
      go to stack fromStack
   end if
   set lockScreen to FALSE
end mouseUp
```

Script of card button id 99 = "Prev"

```
on mouseUp
   global thisLesson,thisMany,Kont
   global fromStack,fromCard
```

```
hide card button "studentVoice"
hide card button "recordVoice"
hide cd button "Eye"
hide cd button "recordVideo"
hide cd button "Student Video"
set cursor to 4
visual effect scroll right
if fromStack is "CLS" then go to stack ough
else
   if thisMany = 1 then go to stack fromStack
   else
      if Kont = 1 then
         put thisMany into prevKont
         put thisMany + 1 into Kont
         -- Randomize sequence in the lesson
         put thisLesson into trialLesson
         put thisMany into these
         put the random of these into thisOne
         put word thisOne of trialLesson into newLesson
         delete word thisOne of trialLesson    -- remove from list
         put these-1 into these
         repeat until these = 0
            put the random of these into thisOne
            put " " & word thisOne of trialLesson after newLesson
            delete word thisOne of trialLesson
            put these - 1 into these
            if these = 0 then exit repeat
         end repeat
         put newLesson into thisLesson else
         put Kont - 1 into prevKont
      end if
      put Kont - 1 into Kont
      put word prevKont of thisLesson into here
      put "Student:Phonograms:" & here into here
      go to stack here
   end if
end if
end mouseUp
```

Script of card button id 100 = "Next"

```
on mouseUp
   global thisLesson,thisMany,Kont
   global fromStack,fromCard hide card button "studentVoice"
   hide card button "recordVoice"
   hide cd button "Eye"
   hide cd button "recordVideo"
   hide cd button "Student Video"
   set cursor to 4
   visual effect scroll left
   -- if from CLS, go to next phonogram in the sequence
   if fromStack is "CLS" then go to stack c
   else
      -- if thisMany = 1, go back to first card of Lesson stack
      if thisMany = 1 then go to stack fromStack
      else
         -- if Kont = thisMany, go to first phonogram in lesson sequence
         if Kont = thisMany then
            put 1 into nextKont -- to initialize the counters
            put 0 into Kont
            -- Randomize sequence in the lesson
            put thisLesson into trialLesson
            put thisMany into these
            put the random of these into thisOne
            put word thisOne of trialLesson into newLesson
```

```
        delete word thisOne of trialLesson    -- remove from list
        put these-1 into these
        repeat until these = 0
           put the random of these into thisOne
           put " " & word thisOne of trialLesson after newLesson
           delete word thisOne of trialLesson
           put these - 1 into these
           if these = 0 then exit repeat
        end repeat
        put newLesson into thisLesson else
        put Kont + 1 into nextKont
      end if
      -- go to next phonogram in lesson sequence
      put Kont + 1 into Kont
      put word nextKont of thisLesson into here
      -- student volume named "Student"
      -- phonograms should be in a folder named "Phonograms"
      put "Student:Phonograms:" & here into here
      go to stack here
    end if
  end if
end mouseUp
```

Script of card button id 82 = "Speaker"

```
on mouseUp
  global lessonControls, lessonData set cursor to 4
  add 1 to item 1 of line 1 of lessonData
  wait until Fsound() is "done"
  Fplay "b"
end mouseUp
```

Script of card button id 83 = "Microphone"

```
on mouseUp
  hide card button "studentVoice"
  show card button "recordVoice"
  hide card field "len"
  hide message box
  put Record("student",1,1,80,true,"CallBack",the rectangle of card fld "Gauge") int
  hide card button "recordVoice"
  show card button "studentVoice"
end mouseUp
```

Script of card button id 57 = "studentVoice"

```
on mouseUp
  Fplay "student"
end mouseUp
```

Script of card button id 58 = "recordVoice"

```
on mouseUp
  hide card button "startRecording"
end mouseUp
```

Script of card button id 106 = "Keyboard"

```
on mouseUp
  set lockScreen to TRUE
  show card field "Typed Response"
  put " " into line 1 of cd fld "Typed Response"
  set lockScreen to FALSE
``` select line 1 of cd fld "Typed Response"
end mouseUp

Script of card button id 88 = "lightSwitch"

on mouseUp
  global R, Rboa, deltheta, dellin, delsp, delsp2, delx, dely
  global XRES, YRES, xstart, ystart, yline, ascent, descent, dragRate
  global WL, WT, WR, WB, WXC, WYC
  global writeLines, penSize
  global lessonControls, lessonData -- set the userLevel to 3
  set cursor to 4
  set dragSpeed to 0
  choose select tool
  drag from WL,WT to WR,WB
  doMenu Invert
  choose browse tool
  Fplay "b"
  -- set the userLevel to 1
end mouseUp Script of card button id 89 = "fileFolder"

on mouseUp
  global R, Rboa, deltheta, dellin, delsp, delsp2, delx, dely
  global XRES, YRES, xstart, ystart, yline, ascent, descent, dragRate
  global WL, WT, WR, WB, WXC, WYC
  global writeLines, penSize
  global lessonControls, lessonData -- set the userLevel to 3
  -- set cursor to 4
  -- add 1 to item 2 of line 1 of lessonData
  -- Erase screen
  -- freeze screen refresh
  set lockScreen to TRUE
  -- blank screen area 0,0 to XRES,YRES
  set lineSize to 2
  set dragSpeed to 0
  choose select tool
  drag from 0,0 to XRES,YRES
  doMenu Clear Picture
  if writeLines is "Yes" then
    choose pencil tool
    set dragSpeed to 0
    drag from xstart-150,yline-dellin to xstart+150,yline-dellin
    drag from (xstart-150),(yline) to (xstart+150),(yline)
  end if
  -- copy phonogram from tempCard back onto Card
  go to next card
  choose select tool
  drag from WL,WT to WR,WB
  doMenu Copy Picture
  go to previous card
  doMenu Paste Picture
  choose browse tool
  -- allow screen refresh
  set lockScreen to FALSE
  hide card button "recordVoice"
  hide card button "studentVoice"
  hide cd button "recordVideo"
  hide cd button "Eye"
  hide cd button "Student Video"
  -- set the userLevel to 1
end mouseUp Script of card button id 90 = "Eraser"

```
on mouseUp
    hide card button "studentVoice"
    hide card button "recordVoice"
    hide card button "Eye"
    hide card button "recordVideo"
    hide card field "Typed Response"
    -- hide video windoids
    hide card button "Lips Synch"
    hide card button "Hand Signing"
    hide card button "Student Video"
end mouseUp
```

What is claimed is:

1. A method for teaching communication skills utilizing language constructs and a computer based instructional system including processing means, memory means, and input and output means, said method comprising the steps of:

a) evaluating a student's communication skills by using computer generated stimuli requiring the student to respond thereto and the student's previous response data from the memory means, wherein the stimuli and the student's response thereto utilize either touch, movement, sight, sound, or speech;

b) selecting a target instructional objective for mastering a language construct, wherein the target instructional objective is selected by the computer based instructional system from a plurality of hierarchically ranked objectives stored in the system, wherein the target instructional objective either sequentially follows from an objective previously mastered by the student or by a teacher supervising use of the system;

c) using the evaluation to prepare an optimal cognitive strategy to achieve the target instructional objective, wherein the optimal strategy employs touch, movement, sight, sound, and speech as the student progressively encounters subsequent objectives to develop proficiency;

d) testing the student's ability either to reproduce, recognize, write, type, hand sign, speak, spell, use, or translate the target instructional objective by using decision rules stored in the system for comparing the results of the testing to a first predetermined performance criterion stored in the system, whereby the system presents test stimuli and receives the response of the student of the stimulus;

e) repeating steps (c) and (d) if the test results do not exceed the first predetermined performance criterion;

f) when the first predetermined performance criterion has been exceeded, repeating steps (b) through (e) with the next higher hierarchically ranked objective; and g) repeating steps (b) through (f) until the student exceeds a second predetermined performance criterion for the next higher hierarchically ranked target instructional objective.

2. The method of claim 1 wherein the plurality of hierarchically ranked objectives from which the target instructional objective is selected comprise a language construct selected from the group consisting of letters, phonograms, syllables, words, phrases, sentences, paragraphs, essays, and topics.

3. The method of claim 1 wherein (a) the stimuli generated by the system include colors, shapes, outlines of shapes, objects, phonograms, syllables, words, phrases, sentences and paragraphs; (b) the input means comprises a mouse, touch screen, graphics tablet, keyboard, braillewriter, video camera, and microphone; (c) the student's response either by orally repeating a stimulus, recording an oral response either by orally repeating a stimulus, recording an oral response to a stimulus, tracing on the input means of the system, reducing a stimulus to notes, or translating a stimulus from the language in which the stimulus is generated by the system to a specified language; and (d) the first predetermined performance criterion comprising predefined levels of accuracy in the response of the student, number of attempts by the student to achieve the first predetermined performance criterion, time used in making each response, total time used in making all responses needed to exceed the first predetermined performance criterion, smoothness of tracings in the responses involving tracing, smoothness of writing in the response involving writing, accuracy in staying within outlines of stimulus shapes in the responses involving tracing, comparisons of levels of accuracy attributable to use for the input means of the system, replicability of responses in succeeding attempts, degree of improvement of accuracy in succeeding attempts, and retentivity of ability to exceed the first predetermined performance criterion in succeeding attempts.

4. An instructional system for improving communication skills comprising:

(a) a digital computer comprising processing means, memory means, and input and output means, (b) digital information stored in the memory means of said computer comprising logic sequences, language constructs and audio waveforms representing the pronunciation of the language constructs, decision rules, statistical formulas, and definitions of iconographic symbols for display on the output means of said computer and associated with predetermined control features for executing the logic sequences, language constructs, and audio waveforms, and (c) program means for controlling the processing means, memory means, and input and output means of said computer to utilize said digital information stored therein to provide an individualized instructional strategy to a student interacting with said computer, wherein said program means includes means for evaluating the student's capacities for use of each of the available tactile, kinesthetic, visual, verbal, and auditory learning channels by using the decision rules to identify the student's cognitive learning style, rate of comprehension, level of experience, and level of ability using the input and output means of said computer, means for preparing an optimal instructional strategy individually structured for the cognitive learning style, rate of comprehension, level of experience, and level of ability of the student, means for presenting the optimal instructional strategy to the student as sequential lessons through the output means of said computer, means for recording the responses of the student to the sequential lessons to the memory means of said computer, and means for as the recorded responses by using the decision rules stored in the memory means of said computer to determine whether the student has learned the language constructs provided in the optimal instructional strategy.

5. The apparatus of claim 4 wherein the input and output means of said computer comprise a visual display screen for presenting the iconographic symbols for selection by the student, each of the symbols representing an action utilizing the statistical formulas, decision rules, and logic sequences, and means for moving a cursor on said visual display screen for selecting an iconographic symbol.

* * * * *